(12) United States Patent
Hong et al.

(10) Patent No.: US 9,873,094 B2
(45) Date of Patent: Jan. 23, 2018

(54) CROSS-LINKED POLYMERIC MEMBRANES FOR CARBON DIOXIDE SEPARATION

(71) Applicants: UT-Battelle, LLC, Oak Ridge, TN (US); University of Tennessee Research Foundation, Knoxville, TN (US)

(72) Inventors: Tao Hong, Knoxville, TN (US); Sabornie Chatterjee, Knoxville, TN (US); Shannon Mark Mahurin, Lenoir City, TN (US); Brian Keith Long, Knoxville, TN (US); De-en Jiang, Riverside, CA (US); Jimmy Wayne Mays, Knoxville, TN (US); Alexei P. Sokolov, Knoxville, TN (US); Tomonori Saito, Knoxville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 140 days.

(21) Appl. No.: 14/826,338

(22) Filed: Aug. 14, 2015

(65) Prior Publication Data

US 2017/0043303 A1 Feb. 16, 2017

(51) Int. Cl.
*B01D 53/22* (2006.01)
*B01D 71/70* (2006.01)
(Continued)

(52) U.S. Cl.
CPC ........... *B01D 71/70* (2013.01); *B01D 53/228* (2013.01); *B01D 67/0006* (2013.01);
(Continued)

(58) Field of Classification Search
CPC .................. B01D 53/228; B01D 71/70; B01D 2257/504; B01D 2323/30; C08F 136/14; C08F 2500/25
See application file for complete search history.

(56) References Cited

U.S. PATENT DOCUMENTS

| 3,856,758 A | 12/1974 | Ueshima et al. |
| 4,602,922 A | 7/1986 | Cabasso et al. |

(Continued)

FOREIGN PATENT DOCUMENTS

| CN | 102978379 A | 3/2013 |
| ES | 2 121 513 | 11/1998 |

OTHER PUBLICATIONS

Reddy, B.S.R. et al., "Prospects of Siloxane Membrane Technology for Gas Separation—A Review", Journal of Scientific & Industrial Research, (Jul. 2003), vol. 62, pp. 666-677.

(Continued)

*Primary Examiner* — Jason M Greene
(74) *Attorney, Agent, or Firm* — Scully Scott Murphy & Presser

(57) ABSTRACT

A membrane useful in gas separation, the membrane comprising a cross-linked polysiloxane structure having a cross-link density of about $0.1 \times 10^{-5}$ mol/cm$^3$ to about $6 \times 10^{-5}$ mol/cm$^3$, where, in particular embodiments, the cross-linked polysiloxane structure has the following general structure:

(Continued)

wherein $R^1$, $R^2$, $R^3$, $R^4$, $R^5$, and $R^6$ are independently selected from hydrocarbon groups having at least 1 and up to 6 carbon atoms; $A^1$ and $A^2$ are independently selected from cyclic hydrocarbon groups; $L^1$ and $L^2$ are linking groups or covalent bonds; n is an integer of at least 1; r and s are independently selected from integers of at least 1; and p is an integer of at least 10. The invention also includes methods for making and using the above-described membranes for gas separation.

30 Claims, 10 Drawing Sheets

(51) Int. Cl.
C08F 136/14 (2006.01)
B01D 67/00 (2006.01)

(52) U.S. Cl.
CPC ........ C08F 136/14 (2013.01); B01D 2323/30 (2013.01); C08F 2500/25 (2013.01)

(56) References Cited

U.S. PATENT DOCUMENTS

| | | | |
|---|---|---|---|
| 4,765,909 A | 8/1988 | Rourke et al. | |
| 5,733,663 A | 3/1998 | Schuenemann et al. | |
| 6,039,913 A * | 3/2000 | Hirt | B01D 67/0006 264/331.11 |
| 6,455,029 B1 | 9/2002 | Angeletakis et al. | |
| 6,818,133 B1 * | 11/2004 | Wolter | B01D 71/70 210/490 |
| 2006/0207930 A1 * | 9/2006 | Yeager | B01D 71/70 210/490 |
| 2014/0060324 A1 * | 3/2014 | Ahn | B01D 53/228 95/51 |
| 2015/0136690 A1 * | 5/2015 | Xie | B01D 71/06 210/500.3 |
| 2015/0376365 A1 * | 12/2015 | Halbach | B01D 71/70 521/64 |
| 2016/0145433 A1 * | 5/2016 | Corveleyn | C08G 65/007 524/539 |

OTHER PUBLICATIONS

Tian, Z. et al., "Ab Initio Screening of CO2-philic Groups", J. Phys. Chem. A, (2015), vol. 119, pp. 3848-3852.

Floros, G. et al., Ring Opening Metathesis Polymerization of Norbornene and Derivatives by the Triply Bonded Ditungsten Complex Na[W2(micro-C14(THF)2](THF)3, Polymer, (2012), vol. 4, pp. 1657-1673.

Bermeshev, M.V. et al., "Synthesis of High Molecular Weight Poly[3-{tris(trimethylsiloxy)silyl}tricyclononenes-7] and Their Gas Permeation Properties", Macromolecules, (2011), vol. 44, pp. 6637-6640.

Finkelshtein, E. Sh., et al., Addition-Type Polynorbornenes with Si(CH3)3 Side Groups: Synthesis, Gas and Permeability, and Free Volume, Macromolecules, (2006), vol. 39, pp. 7022-7029.

Carta, M. et al., "An Efficient Polymer Molecular Sieve for Membrane Gas Separations", Science, (Jan. 18, 2013), vol. 339, pp. 303-307.

Patel, H.A. et al., "Unprecedented high-temperature CO2 selectivity in N2-phobic nanoporous covalent organic polymers", Nature Communications, (Jan. 15, 2013), vol. 4, pp. 1-8.

Du, N. et al., "Polymer nanosieve membranes for CO2-capture applications", Nature Materials, (May 2011), vol. 10, pp. 372-375.

Du, N. et al., "Advances in high permeability polymeric membrane materials for CO2 separations", Energy Environ. Sci. (2012), vol. 5, pp. 7306-7322.

Crock, J.G. et al., "The group separation of the rare-earth elements and yttrium from geologic materials by cation-exchange chromatography", Chemical Geology, (Aug. 1984), vol. 45, Issues 1-2, pp. 149-163.

* cited by examiner

CROSS-LINKED POLYMERIC MEMBRANES FOR CARBON DIOXIDE SEPARATION

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates to the field of cross-linked polymer compositions and membranes thereof, particularly polysiloxane hybrid organic-inorganic materials, and also methods of gas separation by use of polymer membranes.

BACKGROUND OF THE INVENTION

Due to the extensive use of fossil fuels, global $CO_2$ emissions have increased steadily over the past several decades, with possibly deleterious consequences on the environment. Therefore, significant efforts have been made to reduce $CO_2$ emissions by applying various capture and separation technologies. Compared to most traditional techniques, such as amine-based solvent absorption, passive membrane $CO_2$ separation technology has drawn considerable attention, since the use of high performance passive membranes could offer a significant reduction in energy cost. Moreover, membrane-based separation is an environmentally benign and sustainable methodology.

In membrane separations, the two major parameters of concern are gas permeability and selectivity. Permeability ($P_A$) is defined as the product of gas flux and membrane thickness divided by the pressure difference across the membrane, which is determined by both the gas solubility ($S_A$) and gas diffusivity ($D_A$) ($P_A$=$S_A$×$D_A$), while the gas selectivity ($\alpha_{AB}$) is the ratio of permeability coefficients of any two gases $$\left(\alpha_{AB} = \frac{P_A}{P_B}\right).$$

Given that the target gas pair for flue gas separation is generally $CO_2/N_2$, polymer membranes with both good $CO_2$ permeability and $CO_2/N_2$ selectivity are desirable. In general, polymer membranes are usually evaluated using the so-called Robeson plot and an empirically derived upper-bound that reflects the inherent trade-off relationship between the permeability and selectivity. In this trade-off, membranes that yield high permeabilities are generally less selective and vice-versa (e.g., L. M. Robeson, *Journal of Membrane Science* 1991, 62, 165-185; L. M. Robeson, *Journal of Membrane Science*, 2008, 320, 390-400).

Unfortunately, the gas separation performance of commercially known membranes generally falls significantly below Robeson's upper-bound and does not meet the separation efficiency for practical $CO_2/N_2$ separation. Moreover, as gas separation is particularly needed for large volume processing of gas flows emanating from power plants, membranes with exceptionally high permeability are needed for practical reasons. Simply pursuing membranes with enhanced selectivity (e.g. $CO_2/N_2$ higher than 30) will not improve separation efficiency due to the limitation of pressure difference in practical separation, and membranes with high selectivity but poor permeability would not be useful in $CO_2$ separation. Therefore, a balance between membranes with high permeability and good selectivity will be required for the separation of $CO_2$ from flue gas mixtures.

As a typical rubbery polymer at room temperature, polydimethylsiloxane (PDMS) is known to possess some of the highest permeabilities to various gases, e.g., the reported permeability is 3800 barrer for $CO_2$, 890 barrer for $H_2$, and 400 barrer for $N_2$ (e.g., T. C. Merkel, et al., *J. Polym. Sci. Pol. Phys.*, 2000, 38, 415-434). PDMS has drawn much attention also due to its good physical and mechanical properties (e.g., ductility), good aging profile, low cost, thermal stability, and ease of processing. For $CO_2/N_2$ separation, the reported selectivity of typical PDMS membranes is around 9.5 (Merkel et al. 2000, supra). In PDMS-like rubbery polymer membranes, the liquid-like polymer matrix is known to have poor size-sieving ability (K. Ghosal, et al., *Polym. Adv. Technol.*, 1994, 5, 673-697). If the $CO_2/N_2$ selectivity of those PDMS membranes can be improved while maintaining high permeability, the designed membrane would meet the practical target in efficiency and cost.

SUMMARY OF THE INVENTION

The instant disclosure is directed to cross-linked polysiloxane membranes that demonstrate exceptional performance with high gas permeabilities and good selectivities in separating $CO_2$ from other gases, such as $N_2$. Hence, these membranes have excellent potential for large-scale and efficient gas separation of $CO_2$ from industrial gas emissions. In particular, the instantly described polysiloxane membranes have a composition in which the cross-link density is significantly lower than cross-link densities generally employed in the art of gas separations. The cross-link density of the instantly described polymer membranes is typically in the range of about $0.1 \times 10^{-5}$ mol/cm$^3$ to about $6 \times 10^{-5}$ mol/cm$^3$. It has herein been found that using this lower cross-link density results in a gas separation membrane that advantageously exhibits a combination of high gas permeability along with high selectivity in the separation of carbon dioxide from other gases. Notably, the instantly described cross-linked polymer membrane materials are capable of performing very close to the Robeson upper bound, which makes these membrane materials particularly suitable for industrial scale separation of carbon dioxide.

In particular embodiments, the cross-linked polymer membrane has a composition according to the following structural formula:

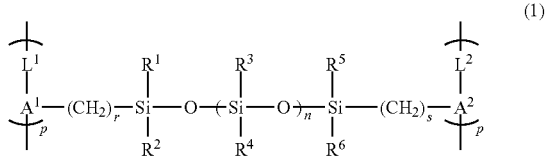

In Formula (1) above, $R^1$, $R^2$, $R^3$, $R^4$, $R^5$, and $R^6$ are independently selected from hydrocarbon groups having at least 1 and up to 6 carbon atoms; $A^1$ and $A^2$ are independently selected from cyclic hydrocarbon groups; $L^1$ and $L^2$ are independently selected from linking groups (for example, hydrocarbon linking groups having at least 1 carbon atom, or inorganic linking groups), or alternatively, $L^1$ and $L^2$ are covalent bonds; n is an integer of at least 1; r and s are independently selected from integers of at least 1; and p is an integer of at least 10.

In another aspect, the instant disclosure is directed to methods for producing the above-described cross-linked polymers and membranes thereof. The method includes cross-linking a polysiloxane precursor under conditions where a cross-link density of preferably about $0.1 \times 10^{-5}$ mol/cm³ to about $6 \times 10^{-5}$ mol/cm³ is achieved. In a first embodiment, the polysiloxane precursor is cross-linked by subjecting the polysiloxane precursor to a hydrosilylation reaction. In a second embodiment, the polysiloxane precursor is cross-linked by subjecting the polysiloxane precursor to a peroxide curing reaction. In a third embodiment, the polysiloxane precursor is cross-linked by subjecting the polysiloxane precursor to a vinyl addition reaction. In a fourth embodiment, the polysiloxane precursor is cross-linked by subjecting the polysiloxane precursor to a ring opening metathesis polymerization (ROMP) reaction.

In particular embodiments, the method includes cross-linking a precursor having the following structure:

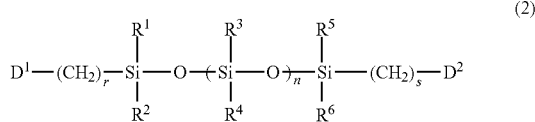

(2)

In a first particular embodiment, the precursor according to formula (2) is subjected to a ring opening metathesis polymerization (ROMP) reaction, wherein $D^1$ and $D^2$ are independently selected from bicyclic hydrocarbon groups having at least one accessible carbon-carbon double or triple bond capable of polymerization by the ROMP reaction, in which case $L^1$ and $L^2$ in the produced cross-linked polymer are independently selected from hydrocarbon linking groups having at least 1 carbon atom. In a second particular embodiment, the precursor according to formula (2) is subjected to a vinyl addition reaction, in which case rings $A^1$ and $A^2$ in the produced cross-linked polymer are directly connected, with $L^1$ and $L^2$ being covalent bonds.

In yet another aspect, the instant disclosure is directed to a method for at least partially separating carbon dioxide from a mixture of gases containing carbon dioxide by use of the above-described cross-linked polysiloxane membranes having a specifically selected lower cross-link density than generally practiced in the art. In the method, the carbon dioxide-containing mixture of gases is passed through any of the above-described cross-linked membranes, wherein gas exiting the cross-linked membrane has an increased carbon dioxide concentration relative to the carbon dioxide-containing mixture of gases before being passed through the cross-linked membrane.

BRIEF DESCRIPTION OF THE DRAWINGS

FIG. 6A shows dielectric loss spectra of sample C ($c_x = 1.19 \times 10^{-5}$ mol/cm³) at −114° C. (solid circles). Lines show the fit of the dielectric spectrum, and two relaxation processes are used. FIG. 6B shows dielectric loss peaks for the pre-cross-linked PDMSPNB, PDMSPNB with different cross-link densities (from 130:0.5 to 130:10, identified as samples A-F, respectively), and conventional PDMS membranes at −114° C. The peaks have been shifted vertically to illustrate the systematic change of the peak shape and position. The curves through circular symbols corresponds to the fits to the Havriliak-Negami function.

DETAILED DESCRIPTION OF THE INVENTION

Figure 1:
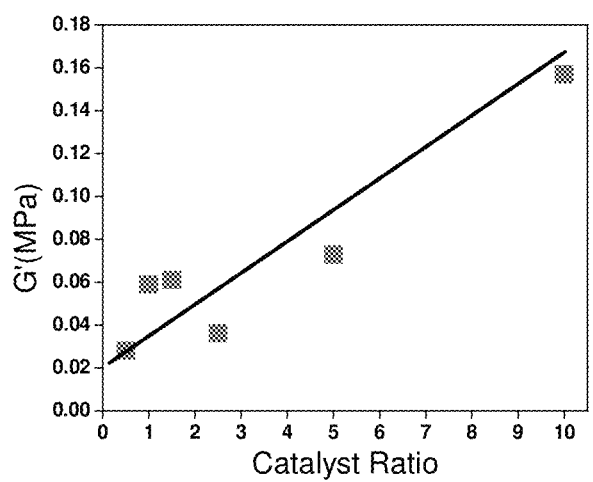
FIG. 1. Graph showing G' (the plateau value of real part of shear modulus) as a function of catalyst ratio for cross-linked (PDMSPNB) membranes varying in polysiloxane precursor to catalyst ratios. The line is present to show the general upward trend.

In a first aspect, the instant disclosure is directed to a membrane useful in gas separation, particularly the separation of carbon dioxide from other gases. The membrane is composed of or includes a cross-linked polysiloxane structure having a lower than conventional cross-link density, typically up to or less than $6 \times 10^{-5}$ mol/cm³, or in more particular embodiments, about, up to, or less than, for example, $5.5 \times 10^{-5}$ mol/cm³, $5 \times 10^{-5}$ mol/cm³, $4.5 \times 10^{-5}$ mol/cm³, $4 \times 10^{-5}$ mol/cm³, $3.5 \times 10^{-5}$ mol/cm³, $3 \times 10^{-5}$ mol/cm³, $2.5 \times 10^{-5}$ mol/cm³, or $2 \times 10^{-5}$ mol/cm³. The cross-link density may alternatively or in addition be about, at least, or above, for example, $0.1 \times 10^{-5}$ mol/cm³, $0.5 \times 10^{-5}$ mol/cm³, $1 \times 10^{-5}$ mol/cm³, $1.5 \times 10^{-5}$ mol/cm³, $2 \times 10^{-5}$ mol/cm³, or $2.5 \times 10^{-5}$ mol/cm³. Any combination of minimum and maximum values of cross-link densities provided above may be used to form a range, such as a cross-link density within a range of about $0.1 \times 10^{-5}$ mol/cm³ to about $6 \times 10^{-5}$ mol/cm³, or about $0.5 \times 10^{-5}$ mol/cm³ to about $6 \times 10^{-5}$ mol/cm³, or about $0.5 \times 10^{-5}$ mol/cm³ to about $2 \times 10^{-5}$ mol/cm³. As used herein, the term "about" generally indicates within ±0.5%, 1%, 2%, 5%, or up to ±10% of the indicated value. Thus, a value of "about 2" generally indicates in its broadest sense 2±10%, which indicates 1.8-2.2.

The term "polysiloxane," as used herein, refers to any polymeric compound or material having at least three Si—O—Si linkages with at least a portion of the Si atoms attached to hydrocarbon groups (R) and/or hydrogen atoms. More typically, the polysiloxane contains at least 5, 10, 20, 50, 100, 200, 500, or 1000 silicon atoms. The polysiloxane will generally have at least some hydrocarbon groups, in which case the polysiloxane can be equivalently referred to as an organopolysiloxane. The organopolysiloxane can have any proportion of M, D, T, and Q groups, according to the conventional designation of groups in polysiloxanes, although in some embodiments the organopolysiloxane possesses only M and D groups, or M and T groups, or M, D, and T groups, or M, D, and Q groups, or M, T, and Q groups, or M, D, T, and Q groups. In some embodiments, the polysiloxane is a polyalkylsiloxane, or more particularly, a polydimethylsiloxane (PDMS), or at least a portion of the polysiloxane contains a polyalkylsiloxane structure.

The term "cross-linked," as used herein, refers to the presence of cross-linking groups in the polysiloxane. As well known in the art, cross-linking groups connect between linear polysiloxane segments to result in a branched (non-linear) structure. In some embodiments, the branched structure is a dendritic or ladder type of structure. The cross-linking groups may have a polysiloxane structure or a completely hydrocarbon structure.

The thickness of the membrane is typically at least 10 nm (0.01 microns). In different embodiments, the porous membrane may have a thickness of precisely, about, up to, less than, at least, or above, for example, 10 nm, 20 nm, 50 nm, 100 nm, 250 nm, 500 nm, 1000 nm (1 µm), 2 µm, or 5 µm, 10 µm, 50 µm, 100 µm, 150 µm, 200 µm, 250 µm, 300 µm, 350 µm, 400 µm, 500 µm, or 1000 µm (1 mm), or a thickness within a range bounded by any two of these values.

The membrane may or may not also contain pores, particularly mesopores (2 to 50 nm pore size) or micropores (less than 2 nm pore size). In different embodiments, the membranes contains pores having a size of up to or less than, for example, 100, 50, 40, 30, 20, 10, 5, 4, 3, 2, 1, or 0.5 nm, or a pore size within a range bounded by any two of these values.

The membrane may or may not also function as part of a layered composite material, wherein the membrane either overlays, underlies, or is sandwiched between one or more layers of another material. In some embodiments, the one or more layers of another material provides greater structural integrity to the membrane. The one or more layers of another material necessarily include structural features (e.g., pores or slits) that permit the gas to flow through the membrane. The one or more layers of another material may be porous or non-porous, and can be composed of, for example, a ceramic (e.g., silica, alumina, or aluminosilicate), paper, plastic, graphite, metal oxide, or an organic, inorganic, or hybrid polymer, or combination thereof. In some embodiments, the membrane is monolithic (i.e., not disposed on or overlaid with a substrate).

In some embodiments, the cross-linked polysiloxane contains only silicon, oxygen, carbon, and hydrogen atoms. In other embodiments, the cross-linked polysiloxane may contain one or more additional types of atoms (herein referred to as "heteroatoms"). The heteroatoms may be selected from, for example, nitrogen, oxygen, phosphorus, sulfur, and halogen (e.g., F, Cl, Br, and/or I) atoms. Generally, the one or more heteroatoms are present in heteroatom-containing groups bound to either silicon or carbon atoms in the cross-linked polysiloxane. In preferred embodiments, the heteroatom-containing groups function to facilitate selective carbon dioxide transport across the membrane. The selective transport can occur by, for example, selective adsorption of gases other than carbon dioxide, or selective interactive facilitation and release of carbon dioxide across and out of the membrane. The heteroatom-containing groups can be attached to a silicon atom or carbon atom of the polysiloxane structure, or the heteroatom-containing groups may be attached to a ring (e.g., cyclopentane or norbornene) in the polysiloxane structure, if such rings are included.

For purposes of the invention, the heteroatom-containing groups are preferably non-acidic (i.e., generally has a pKa of at least or above 7, 8, 9, or 10 in aqueous solution under standard conditions), since acidic groups (e.g., COOH or $SO_3H$) may have low interaction capabilities with carbon dioxide. In particular embodiments, the heteroatom-containing group contains at least one primary or secondary amine functionality and/or at least one or more hydroxyl (—OH) or ether (—O—) functionalities. Some examples of particularly suitable heteroatom-containing groups include primary amine groups (—$NH_2$), secondary amine groups (—NHR), hydroxy groups (—OH), cyano (—CN) groups, hydrocarbyloxy or alkoxy groups (—OR), carbonate groups (—O(C=O)O—), sulfhydryl groups (—SH), mercapto groups (—SR), amide groups (—C(O)$NH_2$ or —C(O)NHR), ureido groups, oxime groups, amidoxime groups, guanidino groups, and organophosphino groups (where the phosphorus atom is attached to at least one aromatic group). In some embodiments, the heteroatom-containing group is a polyalkyleneoxide group, particularly a polyethyleneoxide group of the general formula (—$CH_2CH_2$—O—)$_n$, which is capped at the oxygen end by a hydrogen atom or hydrocarbon group. In other embodiments, the heteroatom-containing group is a heteroatom-containing ring, such as a furan, tetrahydrofuran, piperidine, piperazine, pyridine, pyrazine, imidazole, morpholine, purine, pyrimidine, triazine, or tetrazole ring. In some embodiments, any one or more of the above types of heteroatom-containing groups is excluded.

In another aspect, the instant disclosure is directed to a method for producing the membrane described above. In the method, a polysiloxane precursor is subjected to a cross-linking reaction under conditions that result in a cross-linked polysiloxane structure in the shape of a membrane and having a cross-link density of $0.1 \times 10^{-5}$ mol/cm$^3$ to $6 \times 10^{-5}$ mol/cm$^3$. The polysiloxane precursor may or may not be cross-linked. If the precursor is cross-linked, the precursor undergoes further cross-linking to produce the final cross-linked polysiloxane structure.

In a first embodiment, the polysiloxane precursor becomes cross-linked by subjecting the polysiloxane precursor to a hydrosilylation reaction. As well known in the art, a hydrosilylation reaction refers to an addition reaction between a silylhydride (Si—H) group and an unsaturated (e.g., alkenyl or alkynyl) group, such as a vinylsilyl (Si—CH=$CH_2$) group, in the presence of a platinum catalyst. The polysiloxane precursor may include precisely or at least two, three, four, or more silylhydride groups, and may be reacted with one or more unsaturated molecules, each of which contains at least two, three, four, or more unsaturated carbon-carbon bonds. A general exemplary schematic of such a process is shown below in Reaction Scheme I, with m being a value of at least 2, and n and r independently selected from 0 or an integer of at least 1, for the specific (exemplary) case where the reacting unsaturated molecule is also a polysiloxane and possesses two vinyl groups. Although a polysiloxane unsaturated cross-linking molecule is depicted, the cross-linking molecule may alternatively be completely hydrocarbon-based, such as diacrylate, triacrylate, tetraacrylate, dimethacrylate, divinylbenzene, or trivinylbenzene. Moreover, in one embodiment, the silylhydride-containing molecule may be considered as the polysiloxane precursor, whereas, in another embodiment, the vinyl-containing polysiloxane molecule may be considered as the polysiloxane precursor.

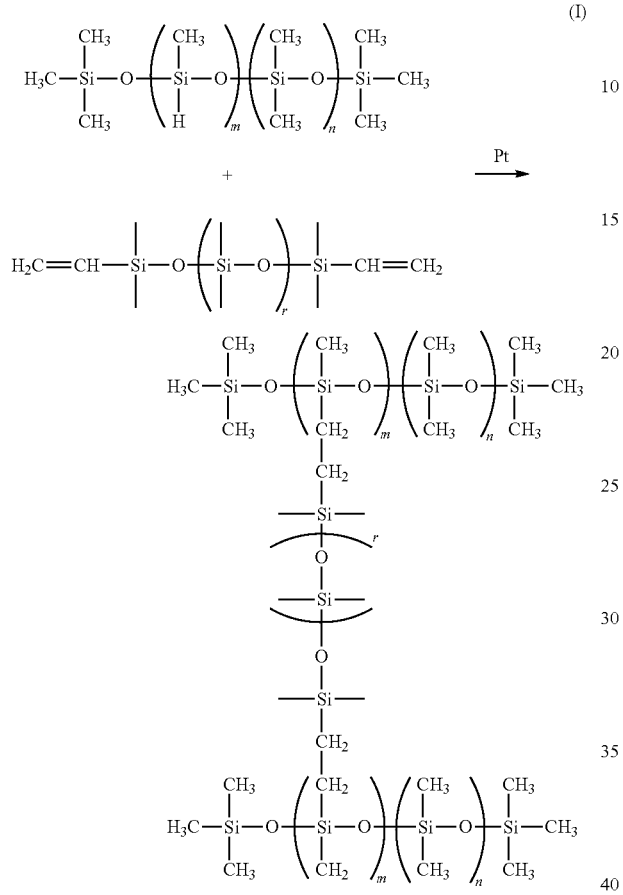

If heteroatom-containing groups, as described above, are desired in the cross-linked product, a polysiloxane precursor containing such heteroatom-containing groups can be subjected to the cross-linking reaction. A general exemplary schematic of such a process is shown below in Reaction Scheme Ia (wherein the heteroatom-containing groups are identified by the group Y):

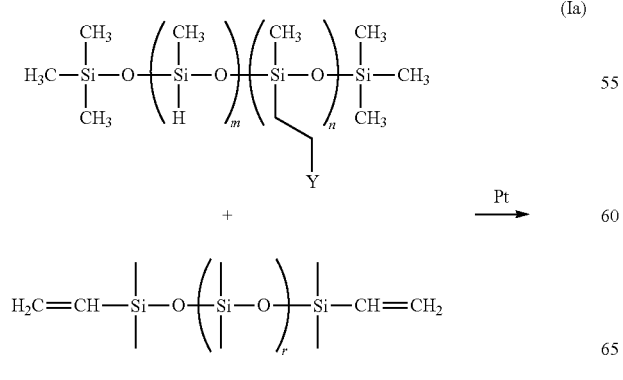

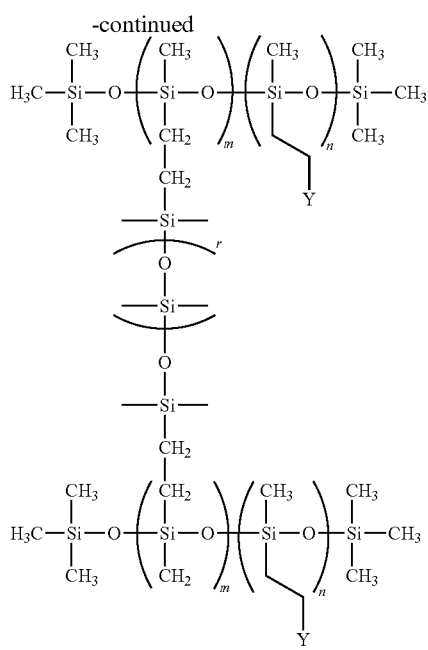

In a second embodiment, the polysiloxane precursor is cross-linked by subjecting the polysiloxane precursor to a peroxide curing reaction. As well known in the art, a peroxide curing reaction refers to an addition reaction between a silylmethyl (Si—CH$_3$) group and an unsaturated (e.g., alkenyl or alkynyl) group, such as a vinylsilyl (Si—CH═CH$_2$) group, in the presence of a peroxide catalyst (identified for simplicity as RO). The polysiloxane precursor may or may not contain heteroatom-containing groups Y, as described above, to result in a cross-linked polysiloxane product that either contains or does not contain heteroatom-containing groups. The polysiloxane precursor may include precisely or at least two, three, four, or more silylmethyl groups, and may be reacted with one or more unsaturated molecules, each of which contains at least two, three, four, or more unsaturated carbon-carbon bonds. A general exemplary schematic of such a process is shown below in Reaction Scheme II, for the specific (exemplary) case where the reacting unsaturated molecule is also a polysiloxane and possesses two vinyl groups. Although a polysiloxane cross-linking molecule is depicted, the cross-linking molecule may alternatively be completely hydrocarbon-based, such as diacrylate, triacrylate, tetraacrylate, dimethacrylate, divinylbenzene, or trivinylbenzene. Moreover, in one embodiment, the silylmethyl-containing molecule may be considered as the polysiloxane precursor, whereas, in another embodiment, the vinyl-containing polysiloxane molecule may be considered as the polysiloxane precursor.

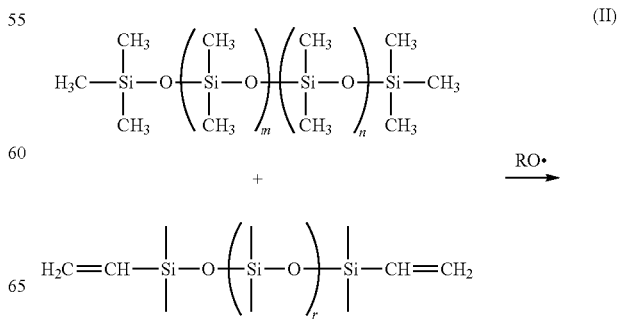

-continued

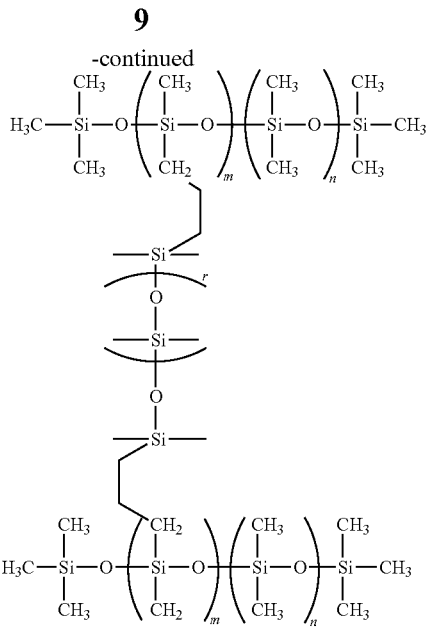

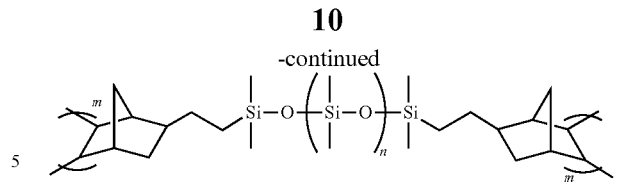

In a third embodiment, the polysiloxane precursor is cross-linked by subjecting the polysiloxane precursor to a vinyl addition reaction. As well known in the art, a vinyl addition reaction refers to free-radical polymerization reaction between two unsaturated groups, such as between acrylate or methacrylate groups, in the presence of an addition catalyst or radical initiator, such as a peroxide compound (e.g., benzoyl peroxide) or nitrile compound (e.g., AIBN). For the instant purposes, for proceeding via an addition reaction, the polysiloxane precursor should contain at least two, three, four, or more unsaturated groups, typically carbon-carbon double or triple bonds, which may be part of an acyclic or cyclic hydrocarbon group. The polysiloxane precursor may then undergo an addition reaction with itself (i.e., not in the presence of another unsaturated molecule) or may undergo an addition reaction with one or more other unsaturated molecules, each of which have at least two, three, or more unsaturated groups. The unsaturated groups may be either part of a linear or branched structure, or may be part of a ring (e.g., cyclopentene or norbornene ring), or may include both. A general exemplary schematic of such a process is shown below in Reaction Scheme III below. Although only an unsaturated polysiloxane cross-linking molecule is depicted, one or more hydrocarbon-based unsaturated molecules, such as a diacrylate or dimethacrylate, may be included for addition reaction with the unsaturated polysiloxane.

(III)

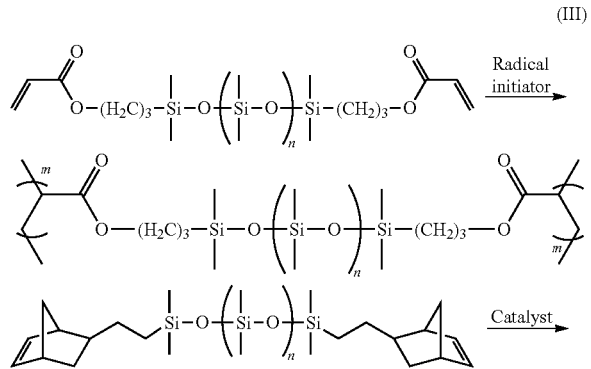

In the case where a heteroatom-containing groups Y are desired to be included in the addition reaction, the polysiloxane precursor may or may not contain heteroatom-containing groups Y, as described above, to result in a cross-linked polysiloxane product that either contains or does not contain heteroatom-containing groups. Alternatively, and more typically, a copolymeric approach can be used in which an unsaturated polysiloxane (e.g., a polysiloxane diacrylate) without heteroatom-containing groups is reacted with a hydrocarbon-based monomer containing heteroatom-containing groups.

In a fourth embodiment, the polysiloxane precursor is cross-linked by subjecting the polysiloxane precursor to a ring opening metathesis polymerization (ROMP) reaction. As well known in the art, a ROMP reaction occurs by ring opening of an unsaturated ring in the presence of a catalyst (typically ruthenium-based) active for ring opening and ensuing polymerization. For purposes of the instant invention, in order to be capable of engaging in a ROMP reaction, the polysiloxane precursor should possess precisely, up to, or at least one, two, or three unsaturated rings. The unsaturated ring typically contains at least one carbon-carbon double or triple bond, and more typically, at least one, two, or three carbon-carbon double bonds. The unsaturated ring typically contains less than six carbon atoms, e.g., up to or precisely three, four, or five ring carbon atoms, and should be non-aromatic. The unsaturated ring can be monocyclic, bicyclic, or tricyclic. Some examples of suitable unsaturated rings include, for example, cyclopentene, cyclobutene, cyclopentene, norbornene, norbornadiene, dicyclopentadiene, phenylnorbornene, 1,2,3,4,4A,5,8,8A-octahydronaphthalene, and 1,4,5,8-dimethylamino-1,2,3,4,4a, 5,8,8a-octahydronaphthalene, any of which can be bound to the polysiloxane precursor either directly or through a linker. The unsaturated ring may or may not also contain one or more hydrocarbon groups on the ring, such as a methyl or ethyl group. Polysiloxane precursors having such unsaturated rings attached can be prepared by methods well known in the art or are commercially available. In the event that heteroatom-containing groups are desired to be included in the ROMP product, the polysiloxane precursor may contain heteroatom-containing groups Y, as described above, to result in a cross-linked polysiloxane product that either contains or does not contain heteroatom-containing groups. The heteroatom-containing group can be on the polysiloxane component and/or ring component of the polysiloxane precursor. Alternatively, and more typically, a copolymeric approach can be used in which an unsaturated polysiloxane (e.g., a polysiloxane dinorbornenyl) without heteroatom-containing groups is reacted with an unsaturated carbocyclic molecule containing heteroatom-containing groups (e.g., norbornene attached to an amidoxime or poly(ethylene glycol) group).

In particular embodiments, the ROMP reaction employs a polysiloxane precursor containing precisely, at least, or more than two unsaturated rings. Such a polysiloxane precursor can be conveniently depicted by the following formula:

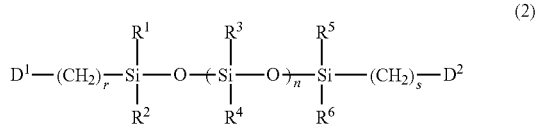

(2)

In the above Formula (2), $D^1$ and $D^2$ are independently selected from unsaturated hydrocarbon rings, and may more particularly be selected from monocyclic, bicyclic, or tricyclic hydrocarbon groups having at least one accessible carbon-carbon double or triple bond capable of polymerization by the ROMP reaction. In one embodiment, $D^1$ and $D^2$ rings do not possess a hydrocarbon or heteroatom-containing group attached to the ring, in which case $D^1$ and $D^2$ rings are referred to as "unsubstituted". In another embodiment, $D^1$ and/or $D^2$ rings possess one or more hydrocarbon and/or heteroatom-containing groups attached to the ring, in which case $D^1$ and $D^2$ rings are referred to as "substituted". The heteroatom-containing groups, if present on $D^1$ and $D^2$ rings, may be any of the heteroatom-containing groups described above, including any of the heteroatom-containing rings or polyalkyleneoxide groups described above. In some embodiments, $D^1$ and $D^2$ rings each contain at least one cyano group, or amidoxime group, or poly(ethylene glycol) group, or tetrahydrofuran group, or a triazole or tetrazole group. However, as indicated above, a more straight-forward approach to introducing heteroatom-containing groups is to react a precursor according to Formula (2), in which $D^1$ and $D^2$ rings do not possess heteroatom-containing rings, with unsaturated carbocyclic molecules containing heteroatom-containing groups (e.g., one or more cyano, amidoxime, poly(ethylene glycol), tetrahydrofuran, triazole, or tetrazole groups). In some cases, the heteroatom-containing group may subsequently be converted to another heteroatom-containing group, such as conversion of cyano groups to amidoxime groups.

The groups $R^1$, $R^2$, $R^3$, $R^4$, $R^5$, and $R^6$ in Formula (2) are independently selected from hydrocarbon groups (R) having at least 1, 2, or 3 and up to 4, 5, or 6 carbon atoms. In some embodiments, the hydrocarbon groups (R) contain only carbon and hydrogen atoms, and may be independently selected from, for example, saturated, unsaturated, linear, branched, cyclic or acyclic groups. Some examples of saturated linear hydrocarbon groups include methyl, ethyl, n-propyl, n-butyl, n-pentyl, and n-hexyl groups. Some examples of unsaturated linear hydrocarbon groups include vinyl, allyl, and 2-propen-1-yl groups. Some examples of saturated branched hydrocarbon groups include isopropyl, isobutyl, sec-butyl, t-butyl, and isopentyl groups. Some examples of unsaturated branched hydrocarbon groups include 2-methyl-2-propen-1-yl and 3-methyl-2-buten-1-yl groups. Some examples of saturated cyclic hydrocarbon groups include cyclopropyl, cyclobutyl, cyclopentyl, and cyclohexyl groups. The unsaturated cyclic hydrocarbon groups may be aromatic or aliphatic. Some examples of unsaturated cyclic hydrocarbon groups include cyclopentenyl and cyclohexenyl groups. If any one of $R^1$, $R^2$, $R^3$, $R^4$, $R^5$, and $R^6$ are unsaturated cyclic hydrocarbon groups, their presence increases the number of unsaturated rings in Formula (2) to more than 2, since they would be in addition to the $D^1$ and $D^2$ unsaturated rings. In some embodiments, the hydrocarbon groups (R) may include one or more heteroatoms or heteroatom-containing groups, such as any of the heteroatoms or heteroatom-containing groups described above. In some embodiments, none of the R groups contain heteroatom-containing groups. In some embodiments, one or more of the R groups in Formula (2) may be alkoxy groups of the formula —OR. In some embodiments, none of the R groups are alkoxy groups.

The subscript n in Formula (2) is an integer of at least 1. In different embodiments, the subscript n may be an integer of at least, for example, 2, 3, 4, 5, 6, 7, 8, 9, 10, 15, 20, 30, 40, 50, 100, 500, or 1000, or a value within a range bounded by any two of the foregoing values. The subscripts r and s in Formula (2) are independently selected from integers of precisely, at least, or up to, for example, 1, 2, 3, 4, 5, 6, 7, 8, 9, or 10.

To effect a ROMP reaction, the above polysiloxane precursor according to Formula (2) is contacted with a ROMP reaction catalyst under suitable conditions, as well known in the art. The ROMP reaction catalyst can be any such catalysts known in the art, particularly ruthenium-based catalysts, such as the well-known Grubbs catalyst, which may be a first generation, second generation, or third generation Grubbs catalyst. Other ROMP-active catalysts include those based on molybdenum, tungsten, or other transition metal, such as described in Floros et al., *Polymers*, 4, pp. 1657-1673 (2012), the contents of which are herein incorporated by reference in their entirety. However, unlike the conventional art, the instant method employs a set of conditions in which a lower than conventional cross-link density, as described above, is achieved. At least one condition herein employed for achieving this lower cross-link density is the use of a specific precursor to catalyst molar ratio in the range of 13:0.5 to 130:10. In different embodiments, a precursor to catalyst molar ratio of about 130:0.01, or 130:0.05, or 130:0.1, or 130:0.2, or 130:0.3, or 130:0.4, or 130:0.5, or 130:1, or 130:1.5, or 130:2, or 130:2.5, or 130:3, or 130:4, or 130:5, or 130:6, or 130:7, or 130:8, or 130:9, or 130:10 is used, or a range between any two of the foregoing ratios is used. In some embodiments, a precursor to catalyst molar ratio of 130:0.5 to 130:2.5 or 130:0.5 to 130:2 is used.

In the specific case where $D^1$ and $D^2$ in Formula (2) are bicyclic or tricyclic rings with a single unsaturated site for ring opening, the above polysiloxane precursor according to Formula (2) undergoes a ROMP reaction to form a cross-linked product having the following general formula:

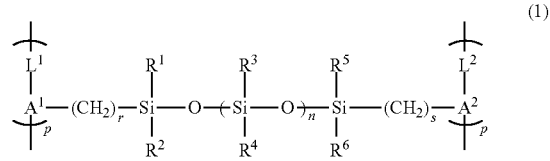

(1)

In Formula (1) above, the subscript p is generally an integer of at least or above 10, 20, 50, 100, 500, 1000, 5000, or 10,000, or in a range bounded by any of these values, and $A^1$ and $A^2$ are independently selected from cyclic hydrocarbon groups. If $D^1$ and $D^2$ in the precursor of Formula (2) are bicyclic rings having a single unsaturated bond (e.g., norbornene), then $A^1$ and $A^2$ are monocyclic rings (e.g., cyclopentyl) in Formula (1) after one of the rings in the bicyclic system undergoes ring opening. Similarly, if $D^1$ and $D^2$ in Formula (2) are tricyclic rings (e.g., dicyclopentadiene), then $A^1$ and $A^2$ may be bicyclic or monocyclic rings after one or two, respectively, of the rings in the tricyclic system undergoes ring opening. When undergoing a ROMP reaction, the linkers $L^1$ and $L^2$ are independently selected from hydrocarbon linking groups having at least 1, 2, 3, or 4 carbon atoms, and which result from the ring opening process. Generally, ring opening of unsaturated rings $D^1$ and $D^2$ results in linkers $L^1$ and $L^2$ that are also unsaturated. For example, in the case of $D^1$ and $D^2$ in the precursor of Formula (2) being norbornene rings, the unsaturated bond of the norbornene ring opens to form a polymerization product in which $L^1$ and $L^2$ are vinyl linkages cross-linking between $A^1$ and $A^2$ as cyclopentyl rings, as well known in the art. As further discussed below, in some embodiments, all or a portion of the $L^1$ and $L^2$ linkers may be cyclic or acyclic hydrocarbon linking groups substituted with one or more heteroatom-containing groups.

As discussed above, in the case where heteroatom-containing groups are desired in the cross-linked product of Formula (1), a precursor according to Formula (2) where $D^1$ and $D^2$ rings not possessing heteroatom-containing rings is typically reacted with unsaturated carbocyclic molecules containing heteroatom-containing groups (e.g., one or more cyano, amidoxime, poly(ethylene glycol), tetrahydrofuran, triazole, or tetrazole groups). In such a case, at least some of the $L^1$ and $L^2$ linkers in the cross-linked product in Formula (1) can be considered as including ring-opened versions of unsaturated carbocyclic molecules containing the heteroatom-containing groups, as described above. If the unsaturated carbocyclic molecules are bicyclic or tricylic unsaturated rings, then ring-opening polymerization with the precursor according to Formula (2) would typically result in a portion of $L^1$ and $L^2$ linkers being carbocyclic monocyclic or bicyclic rings, respectively, containing one or more heteroatom-containing groups. If the unsaturated carbocyclic molecules are monocyclic unsaturated rings, then ring-opening polymerization with the precursor according to Formula (2) would typically result in a portion of $L^1$ and $L^2$ linkers being acyclic unsaturated linkers containing one or more heteroatom-containing groups.

Formula (1) may also represent a cross-linked composition that was not derived from a ROMP reaction. Thus, the linkers $L^1$ and $L^2$ can be any linking groups or even covalent bonds that function to covalently cross-link between rings $A^1$ and $A^2$, i.e., in the pattern -$A^1$-$L^1$-$A^1$- or $A^2$-$L^2$-$A^2$-, as shown in Formula (1). The nature of the linking groups ultimately depends on the reaction used for cross-linking the precursor. For example, in the case where unsaturated rings $D^1$ and $D^2$ in the precursor of Formula (2) are subjected to addition polymerization reaction conditions, linkers $L^1$ and $L^2$ are covalent bonds, and the rings $A^1$ and $A^2$ are equivalent to the rings $D^1$ and $D^2$ except that $A^1$ and $A^2$ possess one less unsaturated bond than rings $D^1$ and $D^2$ at the location where addition polymerization occurs. Thus, in the case where $D^1$ and $D^2$ in the precursor of Formula (2) are norbornene rings, addition polymerization results in $A^1$ and $A^2$ being norbornane rings that are directly connected to each other by covalent bonds $L^1$ and $L^2$.

In other embodiments, $D^1$ and $D^2$ in the precursor of Formula (2) may be unsaturated (aliphatic or aromatic) or saturated hydrocarbon rings (e.g., cyclopentyl, cyclohexyl, or norbornane rings) that possess certain reactive functional groups that can undergo cross-linking. For example, $D^1$ and $D^2$ may be phenol rings, which can be reacted with formaldehyde to form a cross-linked structure in which $A^1$ and $A^2$ in Formula (1) remain as phenol rings with $L^1$ and $L^2$ being methylene linkers (i.e., linking group having one carbon atom). As another example, $D^1$ and $D^2$ may be unsaturated or saturated rings possessing isocyanate groups, which can be reacted with diol or triol cross-linking molecules (or alternatively, diamine or triamine molecules) to form a cross-linked structure in which $L^1$ and $L^2$ are carbamate or urea linkages, respectively. Thus, as provided above, $L^1$ and $L^2$ may include one or more atoms other than carbon and hydrogen, such as oxygen and nitrogen. In some embodiments, $L^1$ and $L^2$ may be solely composed of non-carbon atoms, such as in the case of azo (—N=N—) linking groups, which are well known in the art of azo-containing polymers. The synthesis of azo-containing polymers are well known in the art, such as by coupling aniline groups in the presence of copper (I) bromide and pyridine (e.g., P. Arab et al., *Chem. Mater.*, 26(3), 1385-1392, 2014) or coupling of aniline groups in the presence of t-BuOCl/NaI (e.g., Z. Yang et al., *Chem. Commun.*, 51, 11576-11579, 2015). For any of the possible cross-linking reactions, the cross-link density is maintained to within the lower than conventional values described above by, for example, employing a molar ratio of polysiloxane precursor to catalyst within a specific range, such as any of the ranges provided above.

In the method, the product is rendered into the shape of a membrane. Generally, the product is rendered into the shape of a membrane by mixing the precursor and one or more reactants, if necessary, along with a catalyst, in solution, and applying the solution onto a substrate to form a film and subjecting the film to conditions suitable for facilitating the cross-linking reaction. The solution can be applied onto the substrate by any suitable means known in the art, such as by pouring, spraying, or dipping onto the substrate. The resulting cross-linked film may be removed from the substrate to form a monolithic film, or the substrate may be maintained with the film residing thereon, in a situation where the substrate is included as a functional component of the membrane. Alternatively, the cross-linked product is first produced in a precursor shape that is not in the shape of a membrane or film (e.g., as a block) and the precursor shape is sliced by methods well known in the art to produce the membrane shape.

In yet another aspect, the instant disclosure is directed to a method of at least partially separating carbon dioxide from a carbon dioxide-containing mixture of gases by use of the above-described cross-linked membranes. The carbon dioxide-containing mixture of gases contains carbon dioxide in admixture with at least one, two, or three other gases, such as one or more of nitrogen, oxygen, hydrogen, and methane. The carbon dioxide-containing mixture of gases can be, for example, air or an emission from a chemical or industrial process. In the method, the carbon dioxide-containing mixture is passed through any of the above-described membranes having a cross-linked polysiloxane structure. For the method to be effective, gas exiting the membrane should have an increased carbon dioxide concentration relative to the mixture of gases before being passed through the membrane. Depending on the selectivity of the membrane for preferentially expelling carbon dioxide over other gases, the gas exiting the membrane may be slightly or greatly increased in carbon dioxide content. The selectivity of the membrane for carbon dioxide transport is preferably at least or above 5 over one or more other gases in the mixture, particularly nitrogen. In different embodiments, the membrane exhibits a selectivity for carbon dioxide transport of at least or above, for example, 5, 8, 10, 12, 13, 14, 15, 18, 20, 25, 30, 40, or 50. Since a primary aim of the instant invention is to provide an efficient selectivity along with substantial carbon dioxide permeability, the permeability of the membrane is preferably at least or above 2000 barrer. In different embodiments, the membrane exhibits a permeability for carbon dioxide of at least or above, for example, 2000, 3000, 4000, 5000, 6000, 7000, 8000, 9000, or 10,000 barrer.

In the case of a partial separation, the exiting gas stream may be passed through the membrane one or more additional times to improve on the separation, or the gas stream may be passed through a multiplicity (two or more) membranes. Moreover, the separation process may be conducted at a higher or lower temperature than room temperature (ca. 25° C.) and/or at a higher or lower pressure than normal atmospheric pressure (ca. 1 atm) in an effort to improve the separation. In some embodiments, the gas separation process may be integrally connected with a gaseous output emanating from an industrial or chemical process. The gaseous output may emanate from, for example, a combustion process, such as an electrical power plant.

The gas separation process described above may also be integrated with a process that uses carbon dioxide that has been separated by the above described process. More particularly, the above described process may provide an in situ-generated source of carbon dioxide for use in a downstream process that either further concentrates, stores, or converts the carbon dioxide. A source of carbon dioxide produced by the instant process may be integrated with, for example, a process for carbon dioxide capture and storage (e.g., by a solid sorbent), or a process for bioconversion of carbon dioxide to a useful chemical, such as a biofuel, or a process of making a food or beverage, or a process for the production of liquid carbon dioxide or dry ice.

Examples have been set forth below for the purpose of illustration and to describe certain specific embodiments of the invention. However, the scope of this invention is not to be in any way limited by the examples set forth herein.

EXAMPLES

Preparation of a Gas Separation Membrane by Cross-Linking of a Norbornene-Functionalized Polysiloxane Precursor In this work, (bicycloheptenyl) ethyl-terminated polydimethylsiloxane (PDMSPNB) membranes with varied cross-link densities were synthesized via ring-opening metathesis polymerization. The developed polymer membranes exhibited higher permeability and better selectivity than conventional cross-linked PDMS membranes. The achieved performance ($CO_2$ permeability~6800 barrer and $CO_2/N_2$ selectivity~14) is more suitable for industrial applications. The key to achieving this high performance is the use of an in situ cross-linking method of the difunctional PDMS macromonomers, which provides lightly cross-linked membranes. By combining positron annihilation lifetime spectroscopy (PALS), broadband dielectric spectroscopy (BDS), and gas solubility measurements, the key parameters necessary for achieving their excellent performance has herein been elucidated.

A facile membrane fabrication approach was applied for the preparation of PDMS-based membranes for $CO_2$ separation with a controlled degree of cross-linking. The room temperature chemical cross-linking reaction of (bicycloheptenyl) ethyl-terminated polydimethylsiloxane (PDMSPNB) via ring-opening metathesis polymerization (ROMP) was developed by reacting PDMSPNB with a Grubbs-II (second generation) catalyst in a dichloromethane solution and drying under argon. The cross-link density was mainly controlled by the ratio of PDMSPNB to Grubbs-II catalyst and was determined by rheological measurements. The use of difunctional PDMS macromonomers allowed for the preparation of free-standing films with much lower cross-link density than conventionally used. Owing to the low cross-link density, the synthesized membranes can provide very high permeabilities of $CO_2$ of up to approximately 6800 Barrer with an impressive selectivity of $CO_2/N_2$ of about 14 in single gas permeation measurements and show similar performance for mixed gas separation. The gas solubility, PALS, and BDS studies were conducted in order to provide a better understanding of the parameters controlling solubility and diffusivity.

A general schematic of the cross-linking process is shown below:

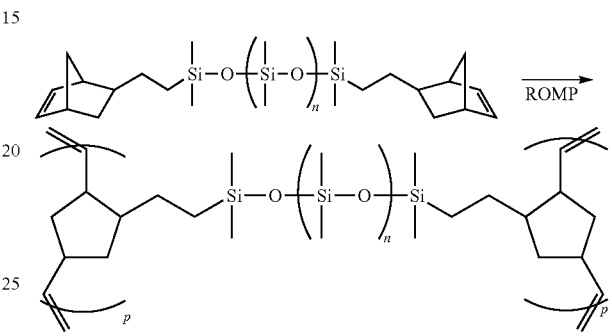

The reaction was performed via ROMP of the norbornene groups on the telechelic position on PDMS. In a typical experiment, PDMSPNB (0.515 g, 3.68×10$^{-5}$ mol) was dissolved 6 mL of dichloromethane (DCM), while Grubbs-II catalyst (1.92 mg, 2.26×10$^{-6}$ mol) was separately dissolved in 2 mL of DCM. Then 0.5 mL of 2 mL of the Grubbs-II stock solution was added to the PDMSPNB solution and the mixture was shaken for 60 seconds before being poured into a 100 mL PTFE dish having a diameter of 10 cm. The PTFE dish was then covered for 1 hour and the in situ cross-linked membrane was formed. A mixture of ethyl vinyl ether (2 mL) in DCM (6 mL) was added to the film to terminate the cross-linking reaction. The membrane was dried under an argon atmosphere overnight and moved into a vacuum oven for three days to remove residual solvent completely. Finally, the cross-linked free-standing polymer membrane was detached from the PTFE dish and cut into approximately 2 cm×2 cm square membranes. The thickness of each membrane was determined using a micrometer. PDMSPNB/Grubbs-II molar ratios varying from 130/0.5 to 130/10 were used during the membrane forming process to control the cross-link density. All permeation measurements were performed within a similar time frame after curing.

A conventional cross-linked PDMS membrane was synthesized and characterized as a control experiment in accordance with the procedure described in Merkel et al., *Journal of Membrane Science*, 359, pp. 126-139, 2010. In the procedure, the membrane was fabricated by mixing a Sylgard® 184 silicone elastomer with a curing agent in a weight ratio of 10:1 using toluene as a solvent to dilute the mixture. The mixture was stirred for 15 minutes before casting it onto a 10 cm×10 cm glass plate. After 1 hour of curing at room temperature, the mixture was placed in an oven and heated for 3 hours at 100° C. The cured film was then moved into a vacuum oven for three days at room temperature to remove residual solvent. Finally, the free-standing PDMS membrane was peeled off the glass substrate and cut for analysis.

Characterization of the Polymer Membrane Formed from Cross-Linking Polysiloxane-Norbornene Precursor Density Characterization.

The density of the membrane samples was measured using a density-gradient column. Pre-calibrated 0.95 g/cm³ and 1.03 g/cm³ density floats with an accuracy of ±0.0002 g/cm³ were added and remained suspended in the column at the level where their density is the same as that of the liquid. After the stabilization of the density floats, cross-linked PDMSPNB membranes were added and allowed to descend to the different levels of the columns. A calibration chart was drawn to calculate the densities of the membranes.

Rheology Measurements.

Small-amplitude oscillatory shear (SAOS) measurements of membrane samples were conducted on an AR2000ex rheometer (TA Instruments) using 4 mm plates parallel plate geometry. The temperature was controlled by an environmental test chamber with nitrogen as a gas source. Prior to the measurement, the sample was purged at 298 K for 3 hours under a nitrogen atmosphere to ensure that thermal equilibrium was achieved. All the samples were measured at 298K in a frequency sweep from 100 to 0.01 Hz, where only cross-link networks contribute to the storage modulus.

The cross-link densities of the membranes were calculated using the measured shear modulus according to the formula:

$$c_x = \frac{\rho}{2M_x} = \frac{G'}{2RT}$$

where $c_x$ is the moles of cross-links per unit volume, p is the density of cross-linked polymer, $M_x$ is the number-average molecular weight of the polymer segments between cross-links, G' is the plateau value of real part of shear modulus, R is the gas constant, and T is the temperature in Kelvin.

Gas Permeability Measurement.

Permeance measurements were performed on the cross-linked membranes using a custom test chamber as described in Mahurin, et al. *Journal of Membrane Science,* 353, 177-183, 2010. This system, which consists of a feed and permeate chamber separated by the test membrane, measures the transient permeation through the membranes. Before loading, the membrane sample was mounted on a 47 mm non-porous aluminum tape sample disc with a hole (typically, 10 mm in diameter) cut in the center, and the membrane edges were sealed to the aluminum using epoxy. The membrane sample was then carefully placed on a highly porous stainless steel support that provided mechanical stability and negligible resistance to gases, and the entire assembly was installed into the test chamber. After loading the membrane, the chamber was evacuated with a mechanical pump to a base pressure of 20 mTorr. The membrane was allowed to remain in the test chamber overnight to fully degas residual solvents and to reach a steady base pressure. The mixed gas permeation measurement (50/50 mol % $CO_2/N_2$) of the sample with PDMSPNB to Grubbs-II ratio 130:1 was carried out. Feed and permeate compositions were determined using a gas chromatograph (GC) equipped with silica gel packed and molecular sieve 13x columns and TCD detector. The gas mixture was controlled using mass flow controllers.

Gas Solubility Measurement.

Low-pressure $CO_2$ solubility measurements were acquired using an Intelligent Gravimetric Analyzer (Hiden Analytical Limited, UK). In a typical experiment, approximately 50 mg of a particular membrane sample was loaded into a quartz container and evacuated to 0.003 bar for 6 hours at 150° C. to degas and dry the sample. All measurements were acquired at room temperature. The mass uptake (corrected for buoyancy) was then measured as a function of pressure up to a final pressure of 1 atm to obtain the absorption isotherm. Desorption isotherms were subsequently acquired by measuring the mass as a function of decreasing pressure to ensure that the solubility behavior was reversible and to test for hysteresis effects. The solubility was then calculated from the slope of the adsorption isotherm in the low carbon dioxide concentration regime.

Positron Annihilation Lifetime Spectroscopy (PALS).

PALS is widely used to analyze the free volume in the membrane structure. Membranes with different cross-link densities were measured at room temperature using a conventional sample-source-sample sandwich geometry. The positron source was made from a $^{22}$NaCl solution evaporated onto the surface of the samples. The stacked two identical membranes were wrapped by a thin aluminum foil to generate a sample assembly. The 1.274 MeV gamma ray, indicating a positron emission event, and the 0.511 MeV annihilation gamma rays were detected using a fast scintillator ($BaF_2$), coupled with photomultiplier tubes (PMT). Different from the traditional experimental setup, a double-stop setup was employed in this work. Data were obtained using a digital oscilloscope with a system timing resolution of 158 ps.

Broadband Dielectric Spectroscopy.

Broadband dielectric spectroscopy measurements were performed by using a Novocontrol Concept 80 system in the frequency range of $10^{-2}$-$10^7$ Hz. The system includes an Alpha-A impedance analyzer, a ZGS active sample cell interface, and a Quatro Cryosystem temperature control unit. All membrane samples were made as an 8 mm diameter circle and placed between two gold-plated electrodes. The Pre-XL PDMSPNB sample was placed between electrodes separated by a Teflon spacer. The system was quenched to −140° C. before the samples were placed into the cryostat to avoid crystallization issues during the measurements. The experiments proceeded from low to high temperatures. The samples were equilibrated at each temperature for 10-20 minutes before the dielectric measurements.

Cross-Linked PDMSPNB with Varied Catalyst Ratio.

All membranes were formed in-situ via the cross-linking reaction of PDMSPNB with Grubbs-II catalyst in a PTFE dish. The as-prepared free-standing membranes exhibited transparent, homogeneous, and elastic properties with thicknesses ranging from 200-250 μm. With the change in PDMSPNB to Grubbs-II catalyst ratios, the membranes showed different ductilities due to the difference in cross-link density.

Cross-Link Densities.

To elucidate the effect of the PDMSPNB to Grubbs-II catalyst molar ratio, the cross-link density was quantified by melt rheology. The G' values as a function of polymer/catalyst ratio are shown in FIG. 1 and summarized in Table 1 below.

TABLE 1

Plateau value of G', molecular weight between cross-links, cross-link density and glass transition temperature ($T_g$) as a function of different PDMSPNB/Grubbs-II ratios.

| PDMSPNB/<br>Grubbs-II ratio | G'<br>(MPa) | $M_x$<br>($10^3$ g/mol) | Cross-link<br>density(mol/<br>cm³) × $10^5$ | $T_g$<br>(K) | Sample<br>code |
|---|---|---|---|---|---|
| 130:0.5 | 0.028 | 86.0 | 0.57 | 148 | A |
| 130:2.5 | 0.036 | 67.1 | 0.73 | 148 | B |
| 130:1 | 0.059 | 41.2 | 1.19 | 148 | C |
| 130:1.5 | 0.061 | 39.0 | 1.23 | 148 | D |
| 130:5 | 0.073 | 33.3 | 1.47 | 148 | E |
| 130:10 | 0.157 | 15.5 | 3.17 | 148 | F |
| Conventional PDMS | 0.387 | 6.3 | 7.81 | 150 | — |

Density values for all the membranes including the conventional PDMS were obtained from density-gradient column measurements (0.9730-0.9881 g/cm$^3$) with an average value of 0.9800 g/cm$^3$ applied for all the calculations of $M_x$ (equation 1) and the cross-link density. The cross-link density of the conventional cross-linked PDMS membrane was also determined by rheology measurements and was calculated to be 7.81×10$^{-5}$ mol/cm$^3$, which is consistent with previously reported values (Merkel, et al., *J. Polym. Sci. Pol. Phys.*, 2000, 38, 415-434).

As shown in FIG. 1 and Table 1, the G' values generally increase with the higher catalyst ratio, while the calculated $M_x$ values show a decreasing trend. In the case of a linear polymer with monofunctionality, the amount of catalyst controls the resulting molecular weight; however, for the difunctional PDMSPNB, the catalyst ratio should control the cross-link density as well as the reaction kinetics. From the rheology data, a higher catalyst ratio resulted in a stronger shear response because the higher catalyst ratio increased the numbers of cross-link junctions in the membrane, thereby generating shorter average chain lengths between cross-links. Notably, the cross-link density in the PDMSPNB membranes is controlled by multiple factors. The catalyst ratio is a dominant factor but the reaction kinetics during in-situ membrane formation could also influence the cross-link density. However, due to the fast reaction rate, it is difficult to kinetically control the formation of cross-link networks within the time range demonstrated in this study. The deviation of the trend for G' vs. catalyst ratio in FIG. 1 is likely due to a combination of variation of reaction kinetics and other possible factors.

Gas Permeation and Separation Properties of Cross-Linked PDMSPNB.

Figure 2:
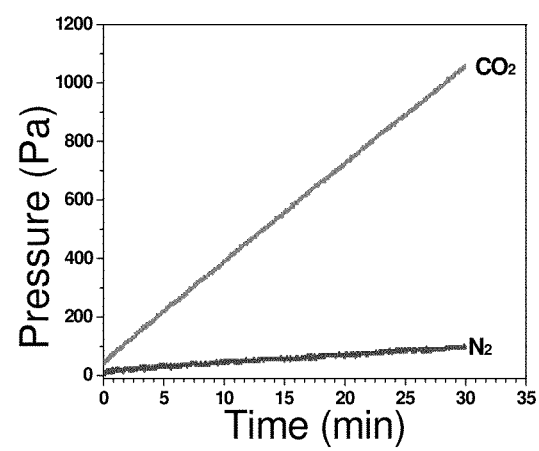
FIG. 2. Graph showing pressure rise in the permeate chamber as $CO_2$ and $N_2$ diffuse through the cross-linked (PDMSPNB) membrane with cross-link density $c_x = 1.19 \times 10^{-5}$ mol/cm³.

All permeability measurements of PDMSPNB membranes were performed at ambient temperature (298±1 K). FIG. 2 shows a representative plot of the $CO_2$ and $N_2$ pressure rise, which are measured on the permeate side of the separation chamber.

Single gas permeability values were calculated using the data collected in the linear regime according to the following equation.

$$P_A = \frac{V_c l}{RT A_m \Delta P} \frac{dP_l}{dt}$$

where $P_A$ is the permeability of the gas A, $V_c$ is the permeate volume, l is the membrane thickness, R is the ideal gas constant, $A_m$ is the membrane area, $\Delta P$ is the difference between the upstream and downstream pressures, and $dP_l/dt$ is the rate of gas pressure increase on the permeate side. In these measurements, the parameters were set up as follows: $V_c$=120 cm$^3$ and $\Delta P$=38 kPa. The selectivity was obtained by calculating the ratio of $CO_2$ permeability to $N_2$ permeability. The permeability of each component in the gas mixture was calculated using the following equation:

$$P_A = \frac{V_c l}{RT A_m \Delta P} \frac{dP_l}{dt} \frac{y_A}{x_A}$$

where $y_A$ is the mole fraction of component A in the permeate side and $x_A$ is the mole fraction of component A in the feed side.

Figures 3A, 3B, 3C:
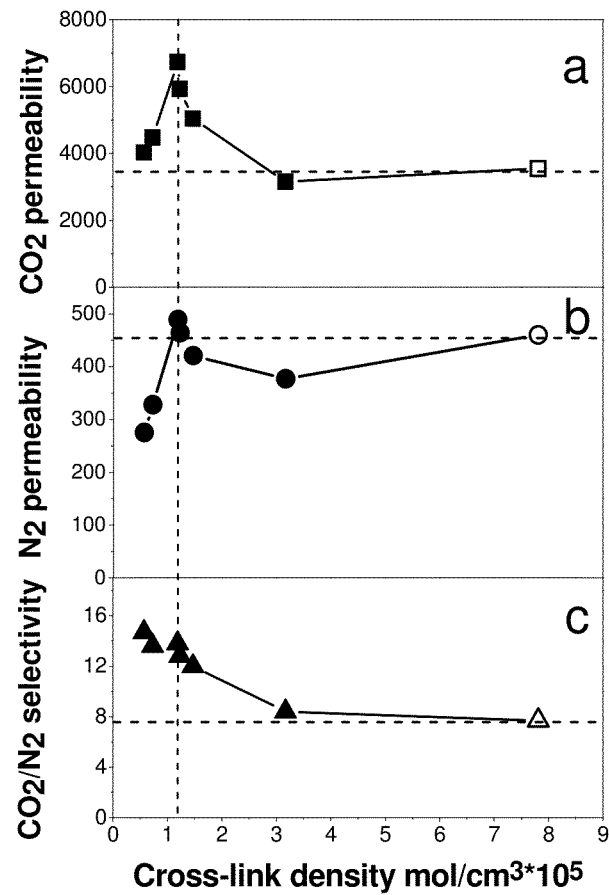
FIGS. 3A-3C. Graphs showing $CO_2$ permeability (FIG. 3A); $N_2$ permeability (FIG. 3B); and $CO_2/N_2$ selectivity (FIG. 3C) as a function of cross-link density for the cross-linked PDMSPNB membranes. Open symbols represent the results of a conventional cross-linked PDMS membrane. Horizontal dashed lines represent the gas permeability and selectivity value for conventional cross-linked PDMS. Vertical dashed lines indicate the sample with highest $CO_2$ permeability.
Figure 4:
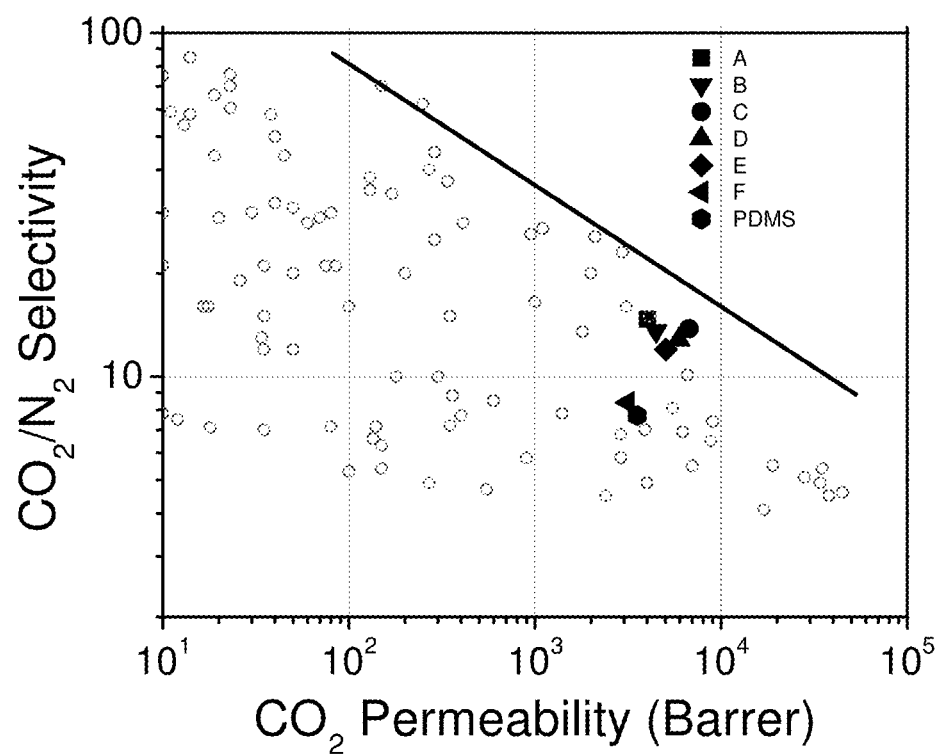
FIG. 4. Graph summarizing the $CO_2/N_2$ selectivity and $CO_2$ permeability Robeson plot values for cross-linked PDMSPNB and conventional PDMS membranes.

All single gas permeability and $CO_2/N_2$ selectivity data for PDMSPNB membranes with varied cross-link density as well as the conventional PDMS membrane are shown in FIGS. 3A, 3B, and 3C and summarized in Table 2 below. The mixed gas permeation data of sample C is also included in Table 2. The updated Robeson's upper bound for $CO_2/N_2$ with the cross-linked PDMSPNB in this study is shown in FIG. 4. For comparison, the permeability and selectivity values of conventional cross-linked PDMS membrane are also included.

TABLE 2

Summary of gas permeability and $CO_2/N_2$ selectivity as a function of cross-link density.

| Sample code | Cross-link density(mol/cm$^3$) × 10$^{-5}$ | $CO_2$ Permeability (Barrer) | $N_2$ Permeability (Barrer) | $CO_2/N_2$ Selectivity |
|---|---|---|---|---|
| A | 0.57 | 4030 | 275 | 14.7 |
| B | 0.73 | 4474 | 329 | 13.6 |
| C | 1.19 | 6734 | 489 | 13.8 |
| D | 1.23 | 5929 | 464 | 12.8 |
| E | 1.47 | 5040 | 422 | 12.0 |
| F | 3.17 | 3154 | 377 | 8.4 |
| — | 7.81 (PDMS) | 3545 | 460 | 7.7 |
| C-mixed | 1.19 | 6343 | 434 | 14.6 |

Gas Solubility Measurements.

$CO_2$ mass uptakes for cross-linked PDMSPNB membranes with different cross-link densities and conventional cross-linked PDMS were measured. Due to the low absorption value, the change of mass was in the 0.15% to 0.20% (0.075 to 0.1 mg) range. The sorption isotherms were calculated from the mass uptake. From the sorption isotherms, the solubility of each membrane was obtained:

$$S \equiv \frac{C}{p}$$

where S is gas solubility, C is the sorption isotherm, and p is the pressure.

Table 3 below summarizes the gas solubilities and PALS results as a function of the cross-link density. It can be noted in Table 3 that the calculated $CO_2$ solubility showed very small differences as a function of cross-link density. When compared to the conventional cross-linked PDMS membrane, the solubility of the cross-linked PDMSPNB membranes showed a slight decrease.

TABLE 3

Summary of gas solubility and PALS results as a function of cross-link density.

| Cross-link density (mol/cm$^3$) × 10$^{-5}$ | S [cm$^3$(STP)/cm$^3$ · atm] | Average Positron lifetime (ns) | Pore diameter (nm) | Average trapping rate (ns$^{-1}$) | Relative pore concentration |
|---|---|---|---|---|---|
| 0.57 | 0.86 ± 0.030 | 2.647 | 0.676 | 1.9664 | 1.00 |
| 0.73 | 1.04 ± 0.053 | 2.751 | 0.691 | 2.6633 | 1.35 |
| 1.19 | 1.10 ± 0.012 | 2.537 | 0.659 | 2.3937 | 1.21 |
| 1.47 | 0.97 ± 0.035 | 2.511 | 0.655 | 3.0143 | 1.53 |
| 3.17 | 1.03 ± 0.011 | 2.431 | 0.643 | 2.6459 | 1.34 |
| 7.81 (PDMS) | 1.25 ± 0.044 | 2.615 | 0.671 | 2.6794 | 1.36 |

PALS Measurements.

For rubbery polymeric membranes, the diffusivity was expected to be influenced by both the free volume and segmental dynamics. In order to study the free volume effect, PALS measurements were conducted. Three separate positron lifetimes are commonly observed in polymers. The first lifetime ($\tau_1$) indicates the positrons being annihilated in the bulk of the materials (<200 ps). The second lifetime, $\tau_2$, is attributed to the positrons being annihilated in defects (300-500 ps). The third lifetime, $\tau_3$, refers to ortho-positronium (o-Ps), a parallel spin complex of a positron and electron, which forms in low electron density regions of the polymer, such as free volumes, holes, interfaces, and pores. The o-Ps lifetime and intensity are often associated with the size and concentration of the open volume in a polymer, respectively. Therefore, the experimentally obtained positron lifetime was fitted by three exponential components. From the fitting procedure, one obtains positron lifetimes and intensities. The o-Ps lifetime, $\tau_3$, is typically related to the average radius of a free volume element, r, which is assumed to be spherical, by the Tao-Eldrup model (S. J. Tao, *J. Chem. Phys.*, 1972, 56, 5499; and M. Eldrup, et al., *Chem. Phys.*, 1981, 63, 51-58).

Figure 5A:
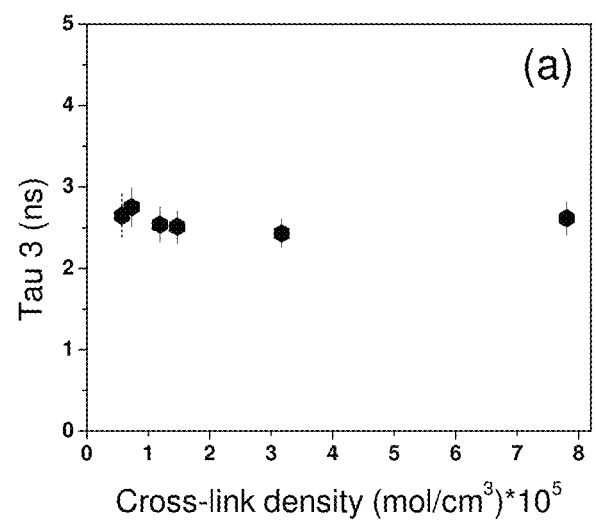
FIGS. 5A, 5B. Graphs plotting $\tau_3$ (ns) vs. cross-link density (FIG. 5A) and trapping rate (ns⁻¹) vs. cross-link density (FIG. 5B).
Figure 5B:
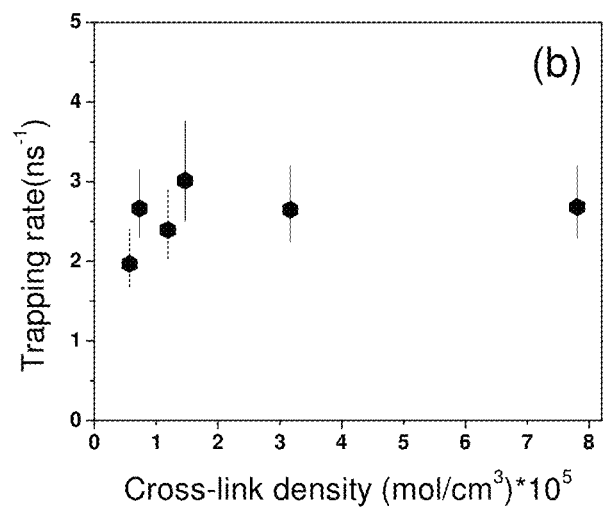

FIGS. 5A and 5B show the PALS data for six different membranes. It can be noticed that the positron lifetime did not show any significant changes with different cross-link density, which revealed a similar pore size inside the dense membranes to be around an average of 0.67 nm (Table 3). The trapping parameters did show some fluctuations within the range of study, which indicated the some minor changes in the pore concentration.

Figure 6A:
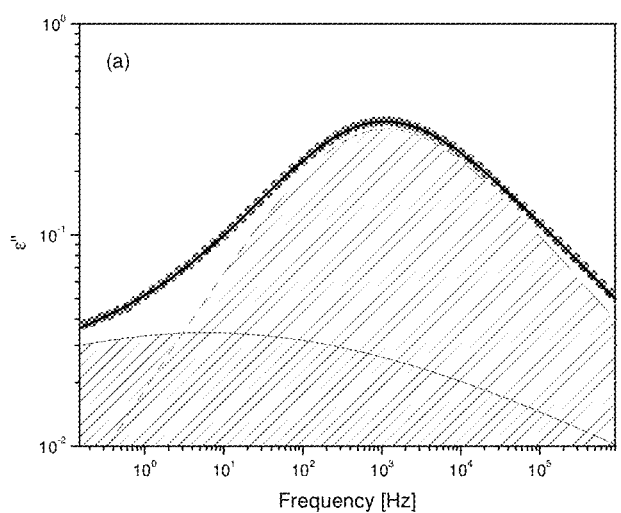
FIGS. 6A, 6B.
Figure 6B:
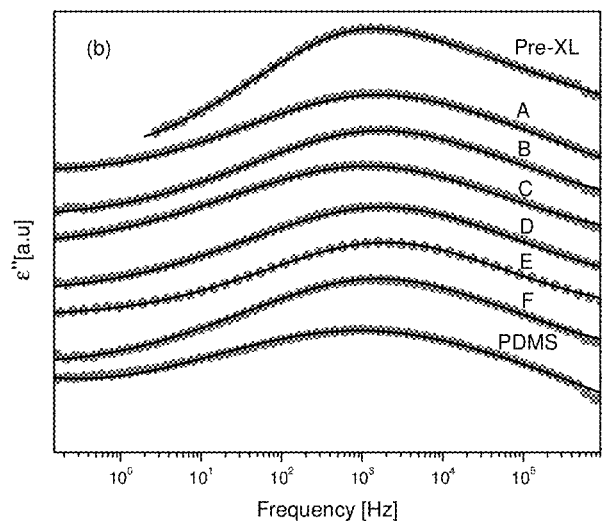

Dynamics study by broadband dielectric spectroscopy measurements. The dynamics of the synthesized membranes were measured using broadband dielectric spectroscopy. The Havriliak-Negami (HN) functions, as well known in the art, were used to describe the main relaxation process in the dielectric spectrum. FIGS. 6A and 6B show the representative dielectric loss spectra and their fits at −114° C.

Figure 7:
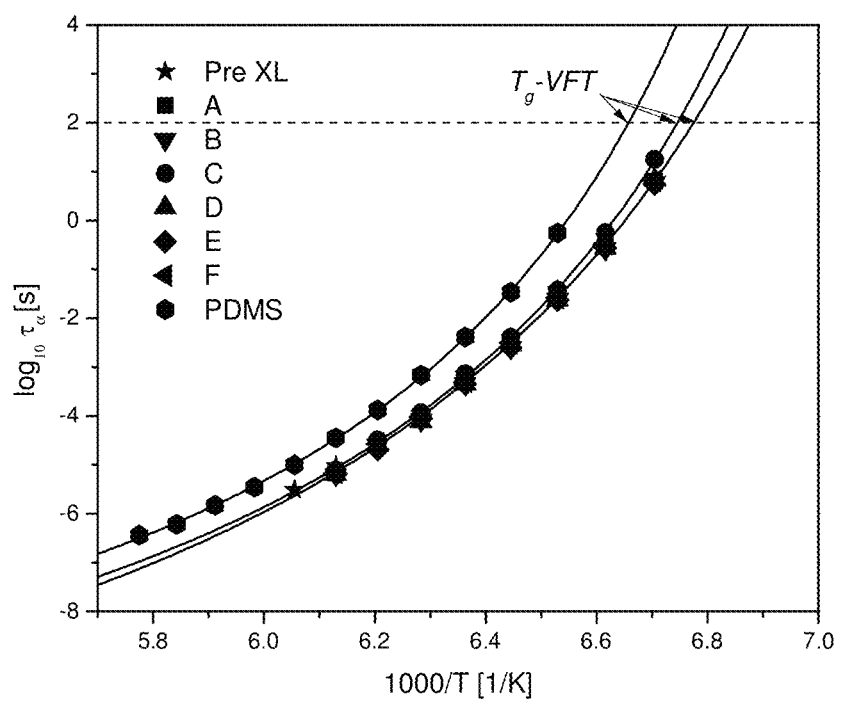
FIG. 7. Graph showing temperature dependence of segmental relaxation time measured by broadband dielectric spectroscopy for different samples of cross-linked membranes. Solid lines were fit to the VFT equation. The glass transition temperature ($T_g$) was determined by VFT extrapolation of the segmental relaxation time to $\tau_\alpha = 100$ s ($\log_{10} \tau_\alpha = 2$).

The temperature dependence of the segmental relaxation time (higher frequency peak) of different samples determined from the Havriliak-Negami fitting function is presented in FIG. 7. The behavior is described by the well-known Vogel-Fulcher-Tammann (VFT) equation in the studied temperature range:

$$\tau = \tau_0 \exp\left(\frac{B}{T - T_0}\right)$$

where $\tau_0$ is the infinite temperature relaxation time, $T_0$ is the so-called VFT temperature, and B is a material specific parameter. The dynamic glass transition temperature ($T_g$) is usually defined at the temperature where the segmental relaxation time $\tau=100$ s. By extrapolating the VFT curves to $\tau=100$ s, a glass transition temperature can be estimated. The calculated $T_g$s of all samples are shown in Table 1 above.

Discussion

Gas Separation Properties of Cross-Linked PDMSPNB Membranes.

The slopes of the $CO_2$ and $N_2$ permeabilities in FIG. 2 clearly show much higher $CO_2$ permeability than that of $N_2$. As evident in FIGS. 3A, 3B, and 3C for cross-linked PDMSPNB membranes, the permeability of both $CO_2$ and $N_2$ showed an increasing trend with the initial increase of cross-link density, and then permeability reached a maximum ($c_x=1.19\times10^{-5}$ mol/cm$^3$) and decreased with further increase in cross-link density. The permeation of $CO_2$ and $N_2$ of the cross-link density $1.19\times10^{-5}$ (mol/cm$^3$) showed the highest flux than any other membranes in this study.

From the Robeson plot (FIG. 4), the cross-linked PDMSPNB membrane achieved much better $CO_2/N_2$ separation than the majority of polymers. The mixed gas permeation measurements of sample C showed very comparable results to that of single gas measurements, which suggests that the PDMSPNB membranes perform similarly well in a mixed gas permeation, which is more relevant to real industrial circumstances. Compared to conventional cross-linked PDMS, the cross-linked PDMSPNB membrane exhibited higher permeability and higher selectivity, and the performance is very close to the Robeson upper bound. The conventional cross-linked PDMS utilizes short chains of PDMS as precursor and requires high cross-link density to make it a free-standing film. The use of the difunctional macromonomer PDMSPNB in this work permitted free-standing films with much lower cross-link density. This membrane fabrication approach to prepare cross-linked membranes has surprisingly revealed that tuning cross-link densities of PDMSPNB using these macromonomers can significantly improve the performance of $CO_2/N_2$ separation. The best performing membrane with a cross-link density of $1.19\times10^{-5}$ (mol/cm$^3$) shows approximately a factor of two improvement in $CO_2$ permeability and $CO_2/N_2$ selectivity over the well-studied conventional cross-linked PDMS. To elucidate how cross-links affect the solubility and diffusivity, the study of $CO_2$ solubility and free volume were also conducted.

Influence of Solubility and Free Volume.

In the rubbery cross-linked membranes studied herein, the permeability does not follow a monotonous trend. The change in gas permeability was expected to be a combined effect of many factors. From the $CO_2$ solubility measurements, all the tested cross-linked PDMS membranes are similar within the range of uncertainty (Table 3), which indicates that the solubility did not play a key role in the enhancement of permeability and selectivity for the PDMSPNB membranes. The $N_2$ solubility of the PDMSPNB membranes was lower than the measurable limit of the device and could not be measured.

The PALS measurements show that the pore size of the PDMS was similar to that of PDMSPNB membranes (Table 3), which indicates that the difference in cross-link density did not greatly influence the pore size. With the increase of cross-link density, the concentration of pores shows fluctuations, which could be interpreted as small changes in the total free volume. However, due to the relatively large error bar, the fluctuations still lie well within the range of uncertainty for these measurements.

Effect of Dynamics in Gas Permeability.

Dielectric loss peaks in FIG. 6 shows that the α-relaxation of all the cross-linked samples broadened at the low frequency side compared to that of the pre-cross-link sample. Similar results were reported for cross-linked PDMS networks and other polymers (Schroeder, et al., *Macromolecules* 2002, 35, 2676-2681; and Roland, *Macromolecules* 1994, 27, 4242-4247), in which the broadening of the peaks were ascribed to the slowing down of segments in the proximity to the cross-link junction. For the instantly described end-cross-linked PDMSPNB membranes, the mobility of the segments near the end junctions are expected to be restricted, which could explain the broadening of the peak at lower frequencies. It can also be noticed that the peak position of the conventional cross-linked PDMS membrane, which has much higher cross-link density than those of the PDMSPNB membranes, was shifted around one order in frequency. This indicates approximately ten times faster segmental motion in the instant membranes relative to conventional cross-linked PDMS at the studied temperatures using dielectric spectroscopy. However, the instant PDMSPNB membranes were only slightly cross-linked, i.e., the concentration of junctions was very small. Thus, compared to pre-XL sample, no apparent shift of the peak position to lower frequencies was observed. The pre-XL and cross-linked PDMSPNB samples did not show any changes in $T_g$ (Table 1), which indicates that, although some segmental motions in cross-linked PDMSPNB samples were restricted, the influence on average segmental relaxation time was not significant. However, the cross-linked PDMSPNB did show faster dynamics than the conventional cross-linked PDMS membranes, which, in part, may explain the significant increase in gas permeability between these two types of membranes. To relate quantitatively the observed increase in gas diffusivity to the change in segmental dynamics, measuring the dynamics at the same ambient temperature would be ideal. Unfortunately, PDMS segmental dynamics at T=298 K would require a faster spectrometer. While the measurements were performed at lower temperature, this dynamics study indicates that the most significant enhancement of $CO_2$ separation of PDMSPNB over conventional cross-linked PDMS should be ascribed to the much faster segmental dynamics despite their similar free volume.

As provided above, a facile room temperature cross-linking reaction of PDMSPNB membranes was developed via in-situ ROMP. The resulting free-standing films were ductile and flexible, and could be readily fabricated to different shapes and coatings. The described membrane fabrication approach for preparing cross-linked PDMS has revealed that tuning cross-link densities of PDMS membranes using these macromonomers can improve $CO_2/N_2$ separation significantly. The cross-linked PDMSPNB membranes achieved excellent $CO_2$ permeability with good selectivity (a factor of two improvement in $CO_2$ permeability and $CO_2/N_2$ selectivity over the well-studied conventional cross-linked PDMS), and their performance is very close to the Robeson upper bound line. The unprecedented performance by a careful design of the macromolecular architecture and cross-link mechanism has revealed the strong potential of the rubbery polymer, PDMS, for gas separation. Although a complete quantitative level of understanding of the obtained results is not yet complete, at least one factor in the improved properties appears to be the faster segmental dynamics in the instantly described membranes.

Figure 10:
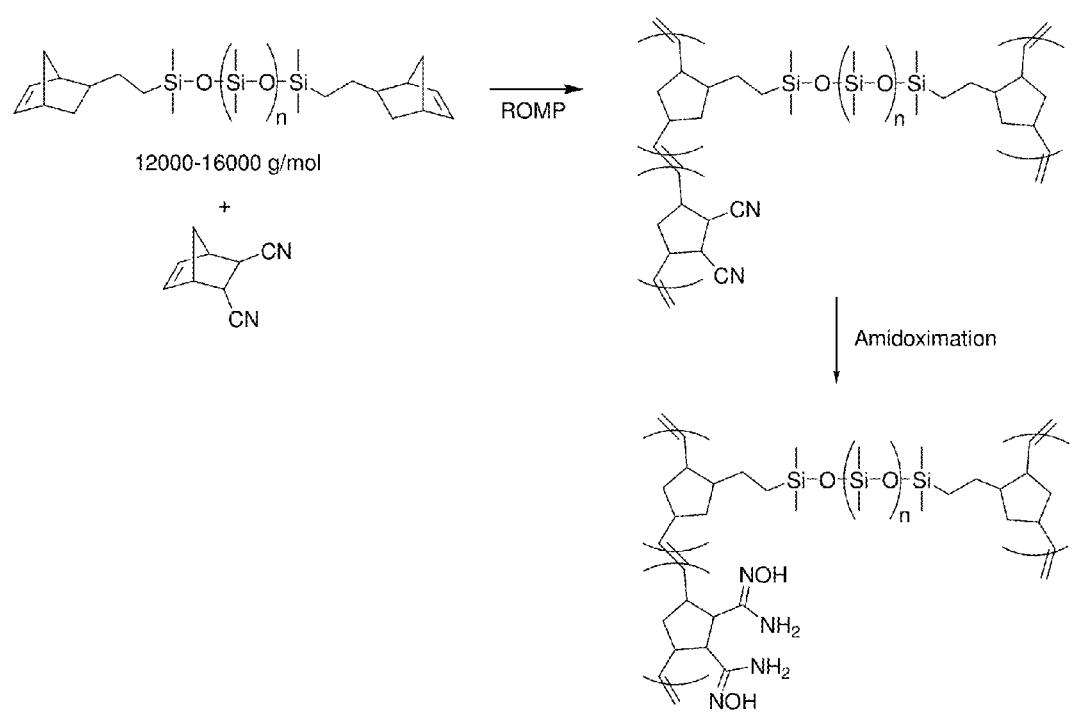
FIG. 10. Schematic showing a ROMP reaction of NbCy-PDMSPNB and the amidoximation of the copolymer membrane.

Preparation of a Gas Separation Membrane Containing Amidoxime $CO_2$-Philic Groups In this experiment, amidoxime groups (as heteroatom-containing groups) are incorporated into the gas separation membrane in an effort to further improve the gas separation properties. FIG. 10 is a schematic showing an exemplary ROMP reaction of NbCy-PDMSPNB and the amidoximation of the copolymer membrane, as used in this experiment. Numerous deviations from the particular conditions used in the schematic in FIG. 10 and as described below are possible for achieving the same or similar end result.

Synthesis of bicyclo[2.2.1]hept-5-ene-2,3-dicarbonitrile(dicyanonorbornene), ("NbCy")

3a,4,7,7a-tetrahydro-1H-4,7-methanoindene (dicyclopentadiene) (7.2 g, 54.4 mmol) was combined with fumaronitrile (9.3 g, 108.8 mmol, 2.2 equv.) in a 300 mL round bottom flask with a stirrer. The mixture was heated at 190° C. for 48 hours under reflux conditions under inert atmosphere. After 48 hours, the dicyanonorbornene (NbCy) product (5.30 g, 72% approx. yield) was isolated from the product mixture using distillation. The product was confirmed by NMR and IR spectroscopy.

The membranes were synthesized by reacting PDMSPNB and NbCy in the presence of a Grubbs-II catalyst in a dichloromethane (DCM) solution, and dried at ambient temperature in a glove box under argon. The reaction was performed via ROMP of the norbornene groups in both the PDMSPNB and NbCy. In a typical process, PDMSPNB (125 mg, $8.93 \times 10^{-6}$ mol) and NbCy (375 mg, $2.60 \times 10^{-3}$ mol) were dissolved in DCM (6 mL) solution, while Grubbs-II catalyst (10 mg, $1.18 \times 10^{-5}$ mol) was dissolved in DCM (2 mL) solution separately. Then 1 mL out of 2 mL of the Grubbs-II catalyst stock solution was added into the solution, and the mixture was shaken for 60 seconds before being poured into a 100 mL PTFE dish (with a diameter of 10 cm). The PTFE dish was then covered by aluminum foil for 72 hours, and the in-situ cross-linked membrane was formed. A mixture of ethyl vinyl ether (2 mL) in DCM (6 mL) was added to the film to terminate the cross-linking reaction. The membrane was then further dried under an argon atmosphere overnight and moved into a vacuum oven for three days to pump out residual solvent completely. Finally, the cross-linked free-standing polymer membrane was detached from the PTFE dish and cut into pieces for further functionalization. In a typical amidoximation experiment, 0.1 g as-prepared membrane was added into methanol (10 mL), with hydroxylamine solution (0.12 g, $1.82 \times 10^{-3}$ mol) further added as well. The mixture was then moved into a 56° C. oil bath where the amidoximation reaction took place. By varying the functionalization time from 6 hours to 48 hours, membranes with different degrees of amidoximation were obtained. The membranes were further washed with methanol and water before being moved into a vacuum oven for another three days. The amidoximation reaction resulted in open chain di-amidoxime functionalized material. It did not form cyclic imide di-oxime. The formation of acyclic bis amidoxime functionality was confirmed by NMR. The membranes were then cut into approximately 2 cm×2 cm squares for permeation measurement.

Figures 8A, 8B, 8C:
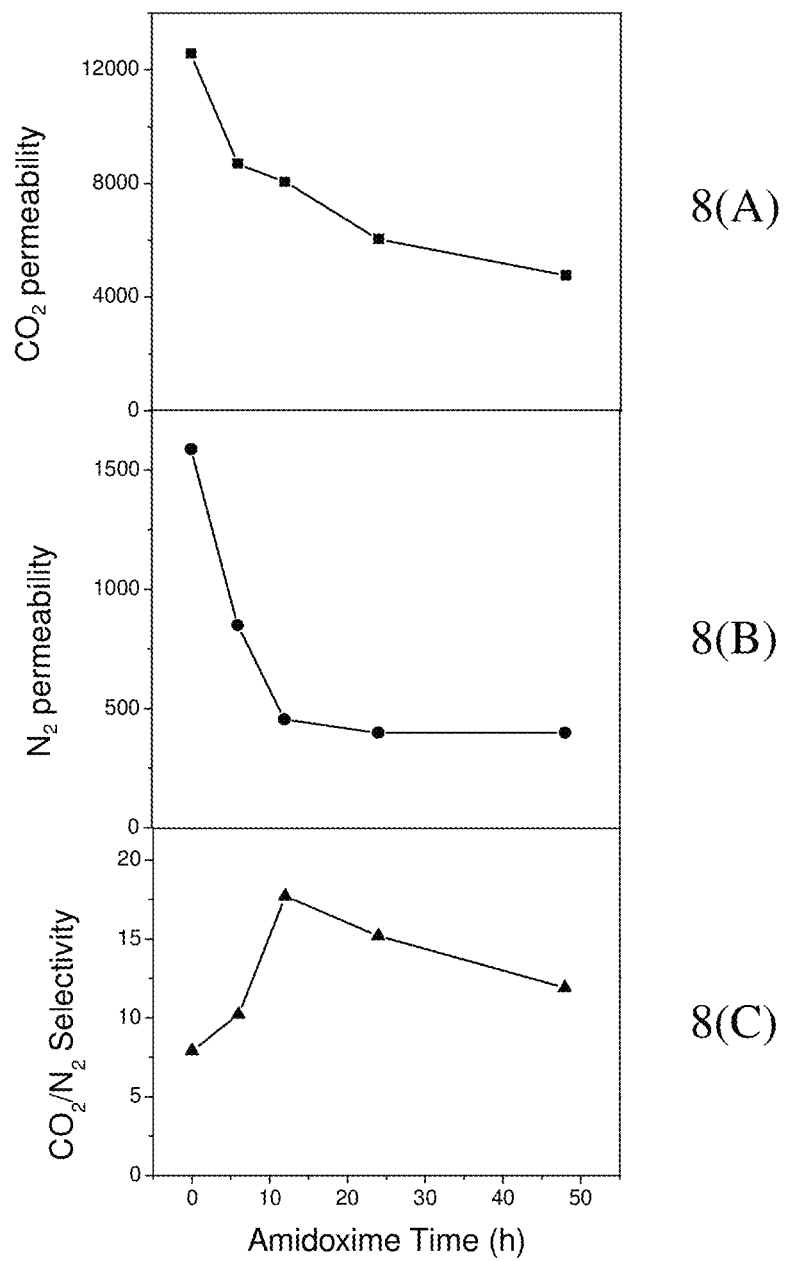
FIGS. 8A-8C. Graphs showing $CO_2$ permeability (FIG. 8A); $N_2$ permeability (FIG. 8B); and $CO_2/N_2$ selectivity (FIG. 8C) as a function of amidoximation time for the cross-linked copolymer of dicyano-norbornene (NbCy)-PDMSPNB membranes.
Figure 9:
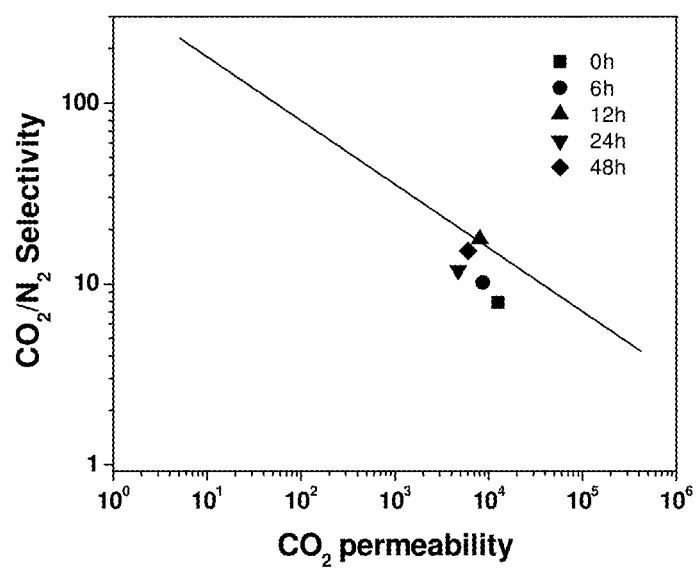
FIG. 9. Graph summarizing the $CO_2/N_2$ selectivity and $CO_2$ permeability Robeson plot values for the cross-linked copolymer of NbCy-PDMSPNB membranes.

All gas permeability and $CO_2/N_2$ selectivity data for NbCy-PDMSPNB membranes with varied amidoximation time are shown in FIGS. 8A, 8B, and 8C and summarized in Table 4 below. The updated Robeson's upper bound for $CO_2/N_2$ with the crosslinked PDMSPNB in this study is shown in FIG. 9.

TABLE 4

Summary of gas permeability and $CO_2/N_2$ selectivity of the NbCy-PDMSPNB membrane as a function of amidoximation time.

| Amidoximation time (hours) | $CO_2$ Permeability (Barrer) | $N_2$ Permeability (Barrer) | $CO_2/N_2$ Selectivity |
|---|---|---|---|
| 0 | 12563 | 1586 | 7.9 |
| 6 | 8697 | 850 | 10.2 |
| 12 | 8049 | 455 | 17.7 |
| 24 | 6035 | 398 | 15.2 |
| 48 | 4752 | 398 | 11.9 |

As shown in FIGS. 8A, 8B, and 8C and as summarized in Table 4, both $CO_2$ and $N_2$ permeability showed a consistent decreasing trend with increase in functionalization time, while the $CO_2/N_2$ selectivity showed a maxima at a functionalization time of 6 hours. The best performance is over the Robeson upper bound, as shown in FIG. 9. Although further characterizations are necessary to elucidate the intrinsic parameters that control the excellent gas transport property, the addition of heteroatoms has herein been demonstrated to further improve the cross-linked PDMSPNB membranes.

While there have been shown and described what are at present considered the preferred embodiments of the invention, those skilled in the art may make various changes and modifications which remain within the scope of the invention defined by the appended claims.

What is claimed is:

1. A membrane useful in gas separation, the membrane comprising a cross-linked polysiloxane structure having a cross-link density of about $0.1 \times 10^{-5}$ mol/cm$^3$ to no more than $2.5 \times 10^{-5}$ mol/cm$^3$.

2. The membrane according to claim 1, wherein the cross-linked polysiloxane structure has the following general structure:

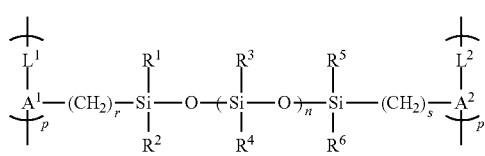
(1)

wherein:
$R^1$, $R^2$, $R^3$, $R^4$, $R^5$, and $R^6$ are independently selected from hydrocarbon groups having at least 1 and up to 6 carbon atoms;
$A^1$ and $A^2$ are independently selected from cyclic hydrocarbon groups;
$L^1$ and $L^2$ are linking groups or covalent bonds;
n is an integer of at least 1;
r and s are independently selected from integers of at least 1; and
p is an integer of at least 10.

3. The membrane according to claim 2, wherein $A^1$ and $A^2$ are cyclopentyl rings.

4. The membrane according to claim 2, wherein $A^1$ and $A^2$ are unsubstituted.

5. The membrane according to claim 2, wherein at least some of $L^1$ and $L^2$ linkers are substituted with a non-acidic heteroatom-containing group containing at least one heteroatom selected from nitrogen, oxygen, and sulfur atoms.

6. The membrane according to claim 5, wherein said non-acidic heteroatom-containing group contains at least one primary or secondary amine functionality and/or at least one or more hydroxy or ether functionalities.

7. The membrane according to claim 2, wherein $L^1$ and $L^2$ each have at least 2 carbon atoms and are unsaturated.

8. A method for producing a membrane useful in gas separation, the method comprising subjecting a polysiloxane precursor to a cross-linking reaction under conditions that result in a cross-linked polysiloxane structure in the shape of a membrane and having a cross-link density of about $0.1 \times 10^{-5}$ mol/cm$^3$ to no more than $2.5 \times 10^{-5}$ mol/cm$^3$.

9. The method according to claim 8, wherein the polysiloxane precursor is cross-linked by subjecting the polysiloxane precursor to a hydrosilylation reaction.

10. The method according to claim 8, wherein the polysiloxane precursor is cross-linked by subjecting the polysiloxane precursor to a peroxide curing reaction.

11. The method according to claim 8, wherein the polysiloxane precursor is cross-linked by subjecting the polysiloxane precursor to a vinyl addition reaction.

12. The method according to claim 8, wherein the polysiloxane precursor is cross-linked by subjecting the polysiloxane precursor to a ring opening metathesis polymerization (ROMP) reaction.

13. The method according to claim 12, wherein said polysiloxane precursor has the following general formula

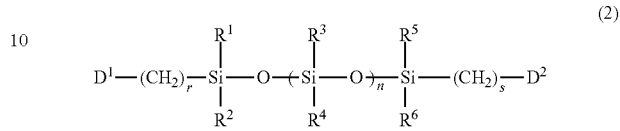
(2)

and said polysiloxane precursor is subjected to a ROMP reaction, wherein $D^1$ and $D^2$ are independently selected from bicyclic hydrocarbon groups having at least one accessible carbon-carbon double or triple bond capable of polymerization by said ROMP reaction;
wherein said ROMP reaction results in a cross-linked polysiloxane structure in the shape of a membrane and having the following general formula:

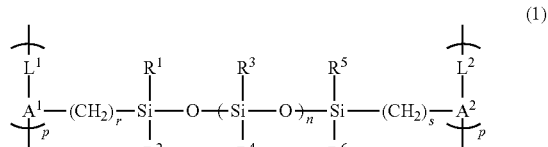
(1)

wherein:
$R^1$, $R^2$, $R^3$, $R^4$, $R^5$, and $R^6$ are independently selected from hydrocarbon groups having at least 1 and up to 6 carbon atoms;
$A^1$ and $A^2$ are independently selected from cyclic hydrocarbon groups;
$L^1$ and $L^2$ are independently selected from hydrocarbon linking groups having at least 1 carbon atom;
n is an integer of at least 1;
r and s are independently selected from integers of at least 1; and
p is an integer of at least 10.

14. The method according to claim 13, wherein $D^1$ and $D^2$ are norbornene rings and $A^1$ and $A^2$ are cyclopentyl rings.

15. The method according to claim 13, wherein $D^1$ and $D^2$ and $A^1$ and $A^2$ are unsubstituted.

16. The method according to claim 13, wherein the polysiloxane precursor is reacted with unsaturated carbocyclic molecules containing at least one non-acidic heteroatom-containing group containing at least one heteroatom selected from nitrogen, oxygen, and sulfur atoms, to result in a cross-linked polysiloxane structure according to Formula (1) in which a portion of $L^1$ and $L^2$ linkers are ring-opened versions of said unsaturated carbocyclic molecules containing said non-acidic heteroatom-containing groups.

17. The method according to claim 16, wherein said non-acidic heteroatom-containing group contains at least one primary or secondary amine functionality and/or at least one or more hydroxy or ether functionalities.

18. The method according to claim 13, wherein $L^1$ and $L^2$ each have at least 2 carbon atoms and are unsaturated.

19. The method according to claim 13, wherein said ROMP reaction employs a ruthenium-based Grubbs catalyst.

20. The method according to claim 19, wherein said Grubbs catalyst is included in the ROMP reaction in a molar ratio of precursor to catalyst of 130:0.5 to 130:10.

21. The method according to claim 19, wherein said Grubbs catalyst is included in the ROMP reaction in a molar ratio of precursor to catalyst of 130:0.5 to 130:2.5.

22. The method according to claim 19, wherein said Grubbs catalyst is included in the ROMP reaction in a molar ratio of precursor to catalyst of 130:0.5 to 130:2.

23. A method for at least partially separating carbon dioxide gas from a carbon dioxide-containing mixture of gases, the method comprising passing the carbon dioxide-containing mixture of gases through a membrane comprising a cross-linked polysiloxane structure having a cross-link density of about $0.1 \times 10^{-5}$ mol/cm$^3$ to no more than $2.5 \times 10^{-5}$ mol/cm$^3$, wherein gas exiting the membrane has an increased carbon dioxide concentration relative to the carbon dioxide-containing mixture of gases before being passed through the membrane.

24. The method according to claim 23, wherein said cross-linked polysiloxane structure has the following general formula:

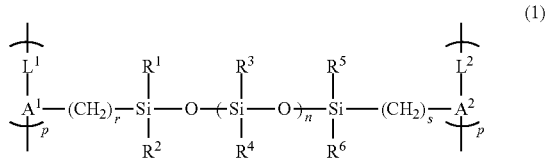

(1)

wherein:

$R^1$, $R^2$, $R^3$, $R^4$, $R^5$, and $R^6$ are independently selected from hydrocarbon groups having at least 1 and up to 6 carbon atoms;

$A^1$ and $A^2$ are independently selected from cyclic hydrocarbon groups;

$L^1$ and $L^2$ are linking groups or covalent bonds;

n is an integer of at least 1;

r and s are independently selected from integers of at least 1; and p is an integer of at least 10.

25. The method of claim 24, wherein the carbon dioxide-containing mixture of gases comprises carbon dioxide and nitrogen, and the method achieves a carbon dioxide to nitrogen selectivity of at least 10.

26. The method according to claim 24, wherein $A^1$ and $A^2$ are cyclopentyl rings.

27. The method according to claim 24, wherein $A^1$ and $A^2$ are unsubstituted.

28. The method according to claim 24, wherein a least some of $L^1$ and $L^2$ linkers are substituted with a non-acidic heteroatom-containing group containing at least one heteroatom selected from nitrogen, oxygen, and sulfur atoms.

29. The method according to claim 28, wherein said non-acidic heteroatom-containing group contains at least one primary or secondary amine functionality and/or at least one or more hydroxy or ether functionalities.

30. The method according to claim 24, wherein $L^1$ and $L^2$ each have at least 2 carbon atoms and are unsaturated.

* * * * *